US012197164B2

(12) United States Patent
Mori

(10) Patent No.: US 12,197,164 B2
(45) Date of Patent: Jan. 14, 2025

(54) IMAGE FORMING APPARATUS INCLUDING ADJUSTING MEMBER THAT ADJUSTS CLEARANCE BETWEEN DEVELOPING ROLLER AND PHOTOCONDUCTOR DRUM

(71) Applicant: KYOCERA Document Solutions Inc., Osaka (JP)

(72) Inventor: Hayato Mori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/213,874

(22) Filed: Jun. 25, 2023

(65) Prior Publication Data

US 2023/0418210 A1 Dec. 28, 2023

(30) Foreign Application Priority Data

Jun. 28, 2022 (JP) ................................ 2022-103751

(51) Int. Cl.
*G03G 21/16* (2006.01)

(52) U.S. Cl.
CPC ..... *G03G 21/1647* (2013.01); *G03G 21/1619* (2013.01); *G03G 21/1671* (2013.01); *G03G 21/1676* (2013.01)

(58) Field of Classification Search
CPC .......... G03G 21/1619; G03G 21/1642; G03G 21/1647; G03G 21/1671; G03G 21/1676; G03G 21/1821
See application file for complete search history.

(56) References Cited

U.S. PATENT DOCUMENTS

2002/0071693 A1* 6/2002 Shimaoka .......... G03G 21/1825 399/113
2023/0418207 A1* 12/2023 Kainuma .......... G03G 21/0076

FOREIGN PATENT DOCUMENTS

JP 2013171068 A 9/2013

* cited by examiner

*Primary Examiner* — Thomas S Giampaolo, II
(74) *Attorney, Agent, or Firm* — IP Business Solutions, LLC.

(57) ABSTRACT

An image forming apparatus includes a photoconductor drum, a developing roller, a first shaft provided for one of the photoconductor drum and the developing roller, a second shaft provided for the other of the photoconductor drum and the developing roller, a first housing that supports the first shaft, a second housing that supports the second shaft, a cylindrical supporting member provided at an axial end portion of the first shaft of the first housing, and surrounding the first shaft without contact, and a first adjusting member fitted with an outer surface of the supporting member, and rotatable in a circumferential direction of the supporting member. An outer circumferential surface of the first adjusting member is formed in an arcuately curved shape, eccentric with respect to the supporting member, and located in contact with the second housing.

4 Claims, 22 Drawing Sheets

1 - 1

I - I

IMAGE FORMING APPARATUS INCLUDING ADJUSTING MEMBER THAT ADJUSTS CLEARANCE BETWEEN DEVELOPING ROLLER AND PHOTOCONDUCTOR DRUM

INCORPORATION BY REFERENCE

This application claims priority to Japanese Patent Application No. 2022-103751 filed on Jun. 28, 2022, the entire contents of which are incorporated by reference herein.

BACKGROUND

The present disclosure relates to an image forming apparatus.

Some of existing image forming apparatuses based on electrophotography include a clearance regulating member slightly larger in diameter than a developing roller, provided at each end portion thereof in the axial direction. The clearance regulating member is made to contact a photoconductor drum, so as to define a predetermined clearance between the outer circumferential surface of the developing roller and the outer circumferential surface of the photoconductor drum. In this case, however, an error may be incurred to the clearance between the developing roller and the photoconductor drum, because of accumulation of permissible error of each of the components.

Accordingly, techniques for adjusting the clearance between the developing roller and the photoconductor drum have been studied. For example, an electrophotographic apparatus is known that includes an interaxial distance adjusting device for adjusting the interaxial distance, so as to locate a developing agent carrier at an adjustment position that is relatively displaced toward and away from the photoconductor, an engagement device for latching the adjustment position at multiple positions along the direction in which the developing agent carrier moves toward and away from the photoconductor, and a fixing device for fixing the adjustment position adjusted by the interaxial distance adjusting device. The interaxial distance adjusting device includes an eccentric cam that displaces the axis of rotation with respect to the axis of rotation of the developing agent carrier, and a positioning device provided on the eccentric cam, to locate the developing agent carrier in position. The engagement device includes an engaging portion provided on the eccentric cam, and including multiple bumps and dips along the rotation direction of the eccentric cam about the axis of rotation, and a latching device including a latching nail for latching the bumps and dips.

SUMMARY

The disclosure proposes further improvement of the foregoing techniques.

In an aspect, the disclosure provides an image forming apparatus including a photoconductor drum, a developing roller, a first shaft, a second shaft, a first housing, a second housing, a cylindrical supporting member, and a first adjusting member. The first shaft is provided for one of the photoconductor drum and the developing roller. The second shaft is provided for the other of the photoconductor drum and the developing roller. The first housing supports the first shaft. The second housing supports the second shaft. The cylindrical supporting member is provided at an axial end portion of the first shaft of the first housing, and surrounding the first shaft without contact. The first adjusting member is fitted with an outer surface of the supporting member, and rotatable in a circumferential direction of the supporting member. An outer circumferential surface of the first adjusting member is formed in an arcuately curved shape, eccentric with respect to the supporting member, and located in contact with the second housing.

DETAILED DESCRIPTION

Hereafter, an image forming apparatus 100 according to some embodiments of the disclosure will be described, with reference to the drawings.

Figure 1:
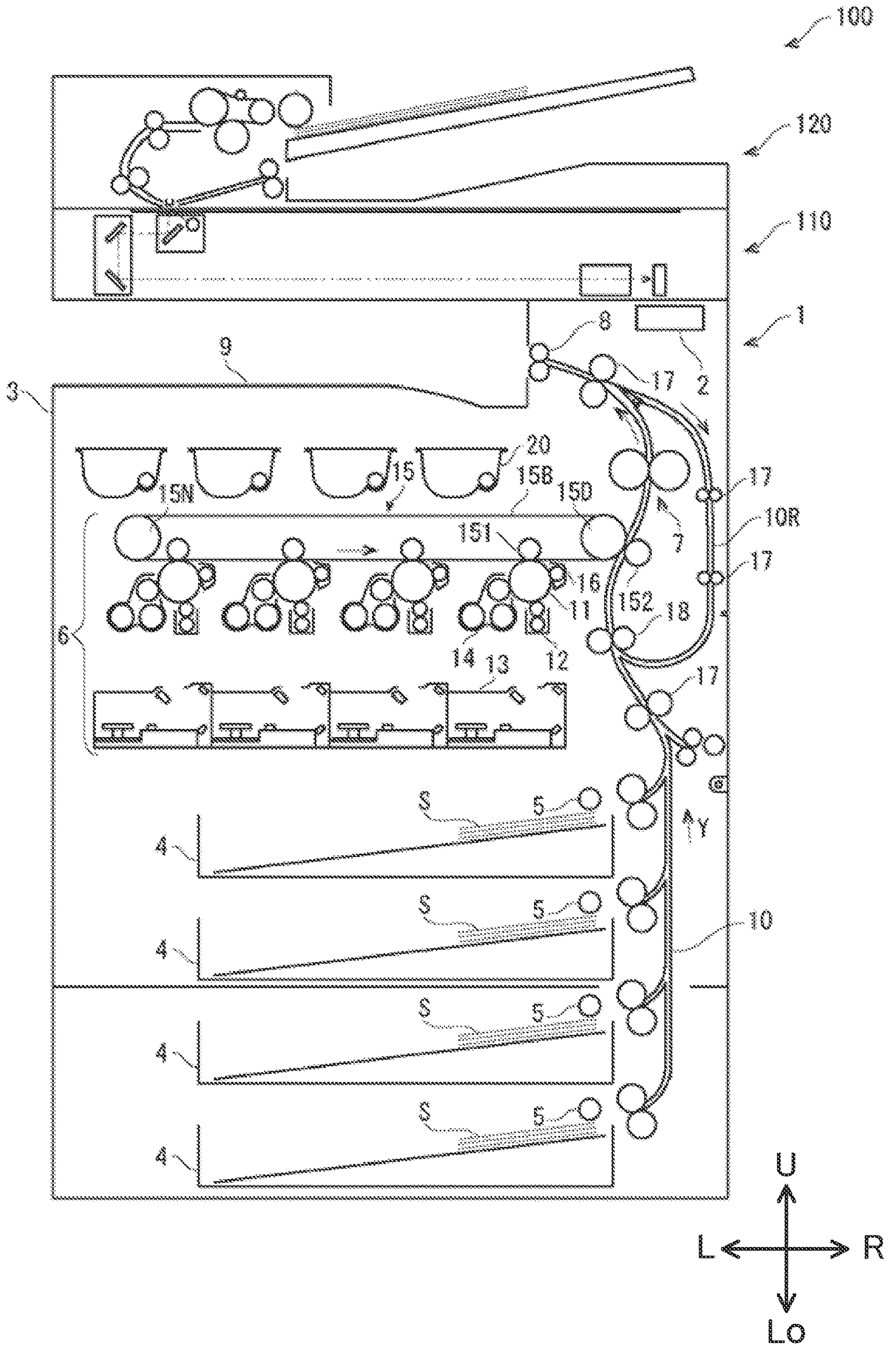
FIG. 1 is a front view schematically showing an internal configuration of an image forming apparatus.

First, a general configuration of the image forming apparatus 100 will be described. FIG. 1 is a front view schematically showing an internal configuration of the image forming apparatus 100. The nearer side in FIG. 1 corresponds to the front (forward) side of the image forming apparatus 100, and the left and right directions will be defined with reference to the front view of the image forming apparatus 100, in the following description. In each of the drawings, U, Lo, L, R, Fr, and Rr indicate the upper, lower, left, right, front, and rear sides, respectively.

The image forming apparatus 100 includes a printer 1, a scanner 110, and a document transport device 120. The scanner 110 is provided on the upper side of the printer 1, and the document transport device 120 is provided on the upper side of the scanner 110. The document transport device 120 transports a source document, via the reading position of the scanner 110. The scanner 110 is a flat-bed image scanner. The scanner 110 reads the source document and generates image data. The printer 1 forms an image based on the image data, on a sheet S.

The printer 1 include a main body housing 3 having a rectangular parallelepiped shape. In the lower portion of the inside of the main body housing 3, a sheet cassette 4 on which the sheets S are stored, and a feeding roller 5 that delivers the sheet S to the right, from the sheet cassette 4. On the upper side of the sheet cassette 4, an image forming device 6 configured to form a toner image by electrophotography is provided. On the upper right side of the image forming device 6, a fixing device 7 that fixes the toner image onto the sheet S is provided. On the upper side of the fixing device 7, a delivery roller 8 that delivers the sheet S, having the toner image fixed thereon, and an output tray 9 on which the delivered sheet S is placed, are provided.

Inside the main body housing 3, a transport route 10 extending from the paper feeding roller 5 to the delivery roller 8, via the image forming device 6 and the fixing device 7, is provided. The transport route 10 is formed of plate-shaped members opposed to each other with a gap therebetween, to allow the sheet S to pass. On the transport route 10, a plurality of transport rollers 17, for pinching and transporting the sheet S, are located at predetermined positions along a transport direction Y. A resist roller 18 is provided at a position upstream of the image forming device 6, in the transport direction Y. On the right side of the fixing device 7, a reversing transport route 10R, branched from the transport route 10 at a position downstream of the fixing device 7 in the transport direction Y, and merging with the transport route 10 at a position upstream of the resist roller 18 in the transport direction Y, is provided.

The image forming device 6 includes a photoconductor drum 11 that varies the potential with irradiation of light, a charging device 12 that electrically charges the photoconductor drum 11, an exposure device 13 that emits a laser beam based on image data, a developing device 14 that supplies toner to the photoconductor drum 11, an intermediate transfer device 15 that transfers the toner image from the photoconductor drum 11 to the sheet S, and a cleaning device 16 that removes the toner remaining on the photoconductor drum 11. The intermediate transfer device 15 includes an endless intermediate transfer belt 15B stretched over a drive roller 15D and a follower roller 15N, a primary transfer roller 151 opposed to the inner circumferential surface of the intermediate transfer belt 15B at the position corresponding to the photoconductor drum 11, and configured to generate a primary transfer bias, and a secondary transfer roller 152 opposed to the outer circumferential surface of the intermediate transfer belt 15B at the position corresponding to the drive roller 15D, and configured to generate a secondary transfer bias. To the developing unit 14, a toner container 20 that supplies the toner to the developing unit 14, is connected.

The image forming device 6 includes four units, each including the photoconductor drum 11, the charging device 12, the exposure device 13, the developing unit 14, the primary transfer roller 151, the cleaning device 16, and the toner container 20. The image forming device 6 is configured to overlap the toner images of four colors on the intermediate transfer belt 15B, to thereby form a color image. Here, the disclosure is also applicable to the image forming apparatus 100 configured to form a color image with the toner of three colors, or five or more colors.

A controller 2 includes an arithmetic device and a storage device. The arithmetic device is, for example, a central processing unit (CPU). The storage device includes storage media such as a read-only memory (ROM), a random-access memory (RAM), or an electrically erasable programmable read-only memory (EEPROM). The arithmetic device executes various operations, by reading out and executing a control program stored in the storage device. Here, the controller 2 may be configured so as to operate solely with an integrated circuit, without utilizing software.

A display/operation device is provided on the front side of the scanner 110. The display/operation device includes a display panel, a touch panel overlaid on the display panel, and a keypad located adjacent to the display panel. The controller 2 causes the display panel to display a screen showing an operation menu or status of the printer 1 and the scanner 110. The controller 2 controls the components of the printer 1 and the scanner 110, according to instructions inputted through the touch panel or the keypad.

Basically, the printer 1 performs the image forming operation as follows. When a simplex printing job is inputted to the printer 1, for example from a display/operation device or an external computer, the feeding roller 5 delivers the sheet S from the sheet cassette 4 to the transport route 10. The resist roller 18 corrects the skew of the sheet S while the rotation of the resist roller 18 is stopped, and delivers the sheet S to the image forming device 6 at a predetermined timing. In the image forming device 6, the charging device 12 electrically charges the photoconductor drum 11 to a predetermined potential, the exposure device 13 writes the latent image on the photoconductor drum 11, the developing device 14 develops the latent image with the toner supplied from a toner container 20, thereby forming the toner image. The primary transfer roller 151 transfers the toner image to the intermediate transfer belt 15B, and the secondary transfer roller 152 transfers the toner image to the sheet S. Then the fixing device 7 fuses the toner image while pinching and transporting the sheet S, thereby fixing the toner image onto the sheet S. The delivery roller 8 delivers the sheet S to the output tray 9. The cleaning device 16 removes the toner remaining on the photoconductor drum 11. In the case of duplex printing, the sheet S having the toner image fixed to the first face is delivered to the transport route 10, through the reversing transport route 10R. Therefore, the toner image is transferred to the second face of the sheet S.

Figure 2:
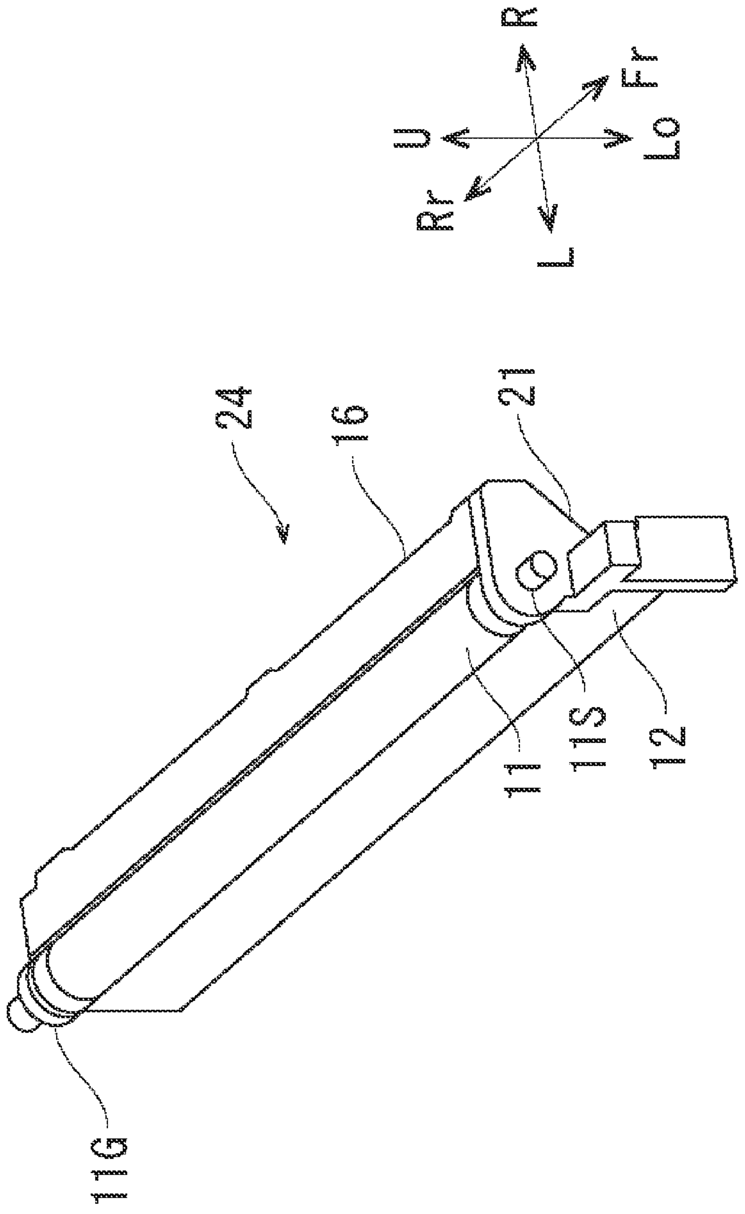
FIG. 2 is a perspective view showing the appearance of a photoconductor unit according to a first embodiment.
Figure 3:
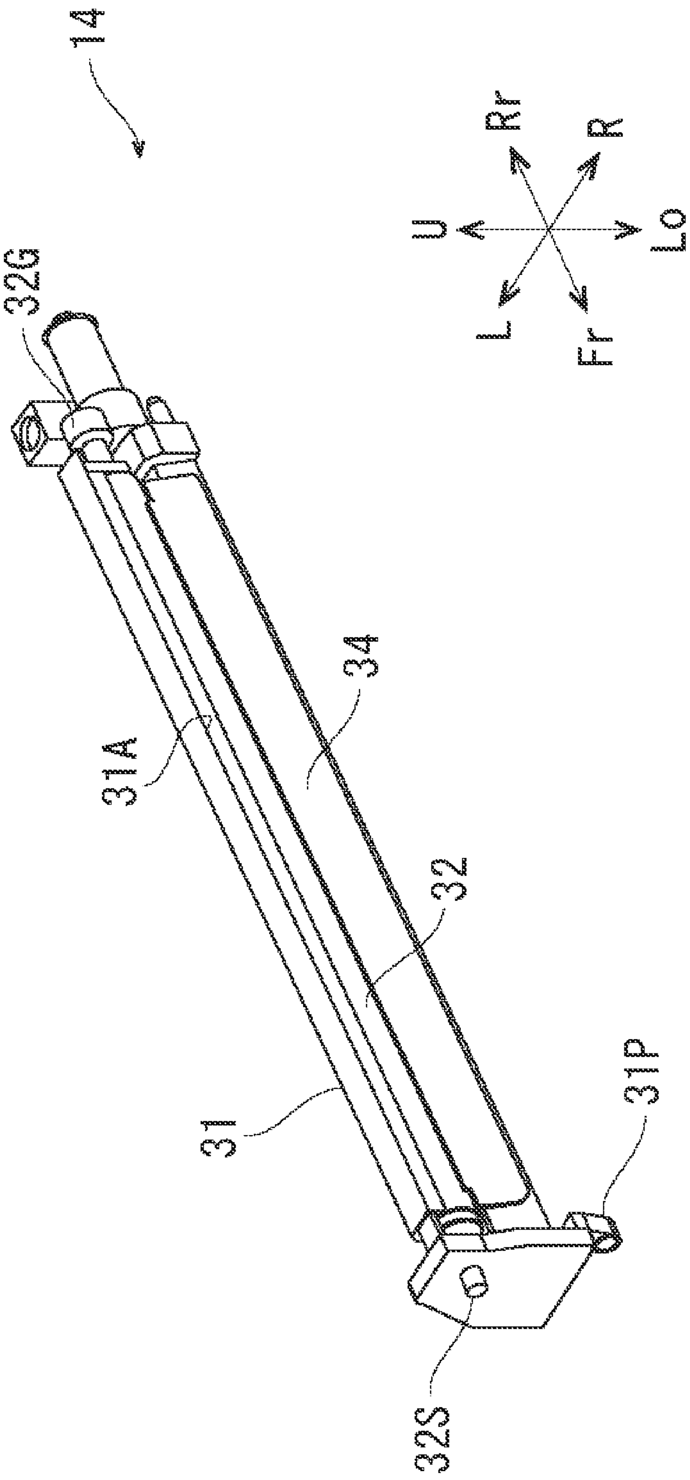
FIG. 3 is a perspective view showing the appearance of a developing unit according to the first embodiment.
Figure 4:
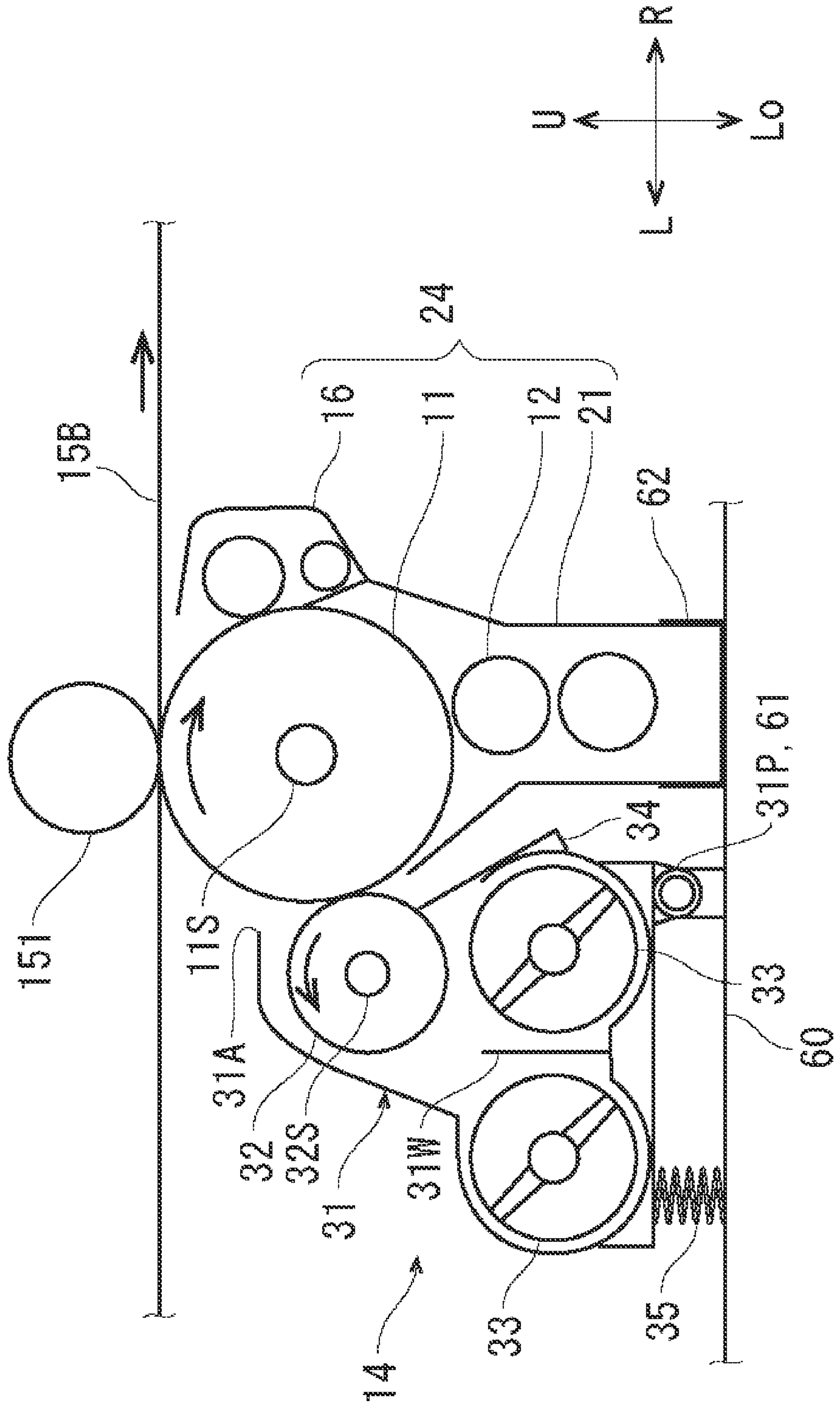
FIG. 4 and FIG. 5 are schematic front views showing an internal configuration of the photoconductor unit and the developing unit, according to the first embodiment.
Figure 5:
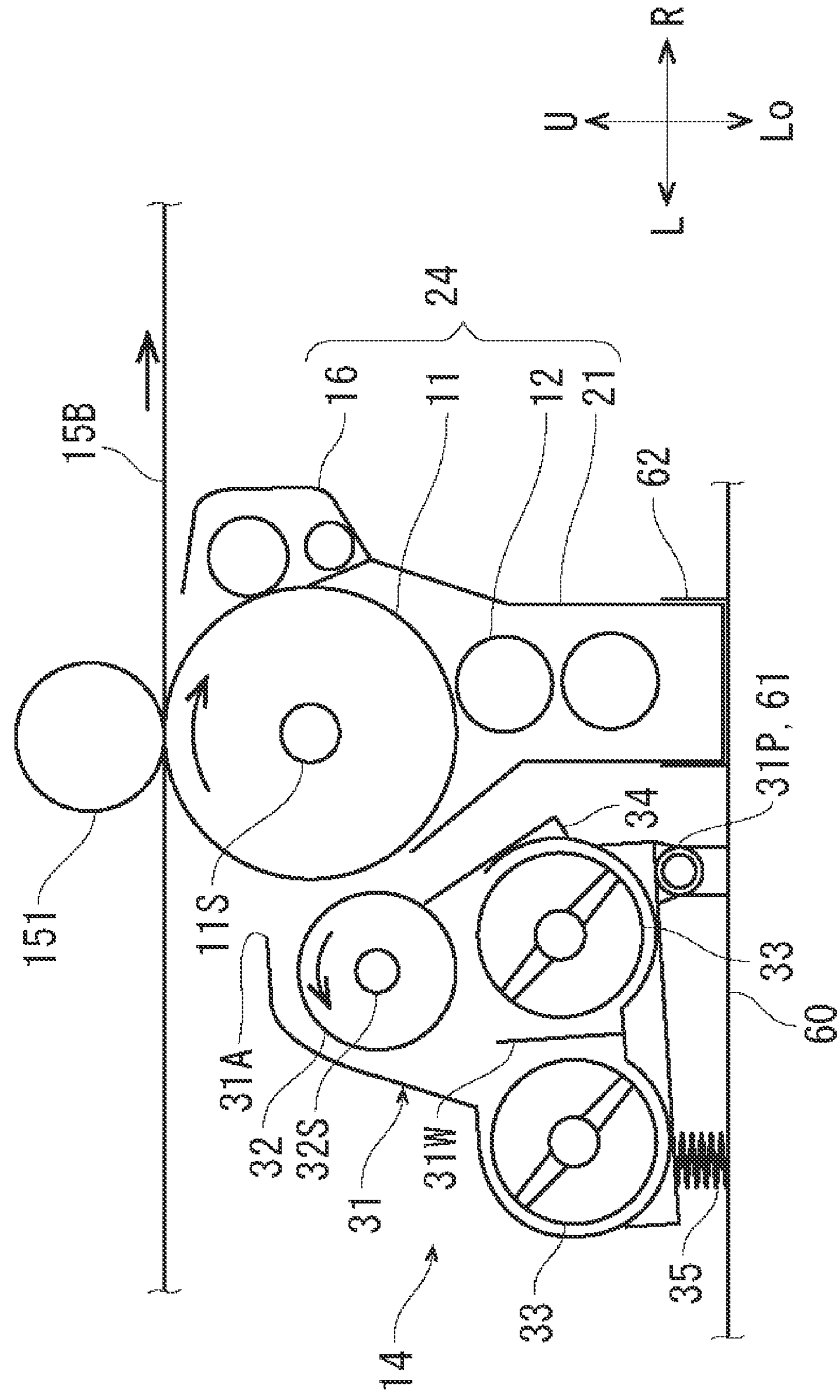

Hereunder, the photoconductor unit 24 and the developing unit 14 will be described. FIG. 2 is a perspective view showing the appearance of the photoconductor unit 24. FIG. 3 is a perspective view showing the appearance of the developing unit 14. FIG. 4 and FIG. 5 are schematic front views showing an internal configuration of the photoconductor unit 24 and the developing unit 14.

Photoconductor Unit 24

The photoconductor unit 24 includes the photoconductor drum 11, the charging device 12, and the cleaning device 16, accommodated in a photoconductor housing 21. The lower portion of the photoconductor housing 21 is formed in a box shape elongate in the front-rear direction. The charging device 12 is located inside of the lower portion of the photoconductor housing 21. A support frame 60 is provided in the main body housing 3. The support frame 60 includes a photoconductor housing base 62, in which the lower portion of the photoconductor housing 21 is fitted. The photoconductor drum 11 is located on the upper side of the charging device 12. The cleaning device 16 is located on the right of the photoconductor drum 11. A shaft 11S of the photoconductor drum 11 is supported by bearings respectively provided on the front and rear end portions of the photoconductor housing 21, and protruding from the front and rear outer faces of the photoconductor housing 21. A follower gear 11G is provided on the rear end portion of the shaft 11S of the photoconductor drum 11.

Developing Unit 14

The developing unit 14 includes two screws 33, a developing roller 32, a developing housing 31, and a blade 34. The two screws 33 each rotate about a shaft, to thereby mix the developing agent. The developing roller 32 retains the developing agent, on the upper side of the screws 33. The developing housing 31 accommodates therein the screws 33 and the developing roller 32, and includes an opening 31A in which a part of the outer circumferential surface of the developing roller 32 is exposed. The blade 34 is located on the lower side of the opening 31A, to regulate the layer thickness of the developing agent retained by the developing roller 32. The developing roller 32 and the screws 33 each have the axis extending in the front-rear direction.

The developing agent is, for example, a two-component developing agent containing a magnetic carrier and a non-magnetic toner. The two screws 33 are aligned side by side in the left-right direction and parallel to each other, inside the developing housing 31, and configured to transport the developing agent in opposite directions to each other. Between the two screws 33, a partition wall 31W is provided. A gap is defined between the front end portion of the partition wall 31W and the inner wall of the developing housing 31, and between the rear end portion of the partition wall 31W and the inner wall of the developing housing 31. The developing agent circulates around the partition wall 31W, through such gaps. Because of the mixing of the developing agent by the screws 33, the toner is frictionally charged.

The developing roller 32 is located on the upper side of the right-hand screw 33, parallel thereto. The developing roller 32 includes a permanent magnet, and a developing sleeve formed of a non-magnetic material covering the periphery of the permanent magnet. A shaft 32S of the developing roller 32 is supported by bearings respectively provided on the front and rear end portions of the developing housing 31, and protruding from the front and rear outer faces of the developing housing 31. A follower gear 32G is provided on the rear end portion of the shaft 32S of the developing roller 32. The opening 31A is formed on the right of the top portion of the developing housing 31, and the portion of the outer circumferential surface of the developing roller 32 exposed from the opening 31A is opposed to the outer circumferential surface of the photoconductor drum 11. The developing agent forms a magnetic brush layer on the surface of the developing roller 32. The blade 34 is mounted with the distal end portion spaced from the developing roller 32 by a predetermined distance, to regulate the layer thickness of the magnetic brush to a predetermined thickness.

The support frame 60 includes support points 61, respectively supporting front and rear positions on the bottom face of the developing housing 31 on the side of the photoconductor unit 24. The developing housing 31 includes support point connectors 31P, located on the bottom face and connected to the respective support points 61. The combinations of the support point 61 and the support point connector 31P each serve as a support point for a pivotal action about the axis extending in the front-rear direction. Thus, the developing housing 31 is pivotable about the support point 61. A biasing member 35 is provided on the left side of each of the support points 61. The biasing member 35 is, for example, a coil spring provided between the support frame 60 and the developing housing 31. The biasing member 35 serves to bias the developing housing 31 toward the photoconductor housing 21. Here, an eccentric cam or a magnetic spring may be employed in place of the biasing member 35, or such a configuration that the developing housing 31 is pressed toward the photoconductor housing 21 by the gravity, may be adopted.

FIG. 4 and FIG. 5 illustrate the pivoting action of the developing housing 31. FIG. 4 illustrates a state where a resisting force is not exerted to the biasing member 35 and the developing roller 32 is located closest to the photoconductor drum 11, in other words where the developing roller 32 is in contact with the photoconductor drum 11. FIG. 5 illustrates a state where the developing housing 31 is pushed back counterclockwise, against the biasing force of the biasing member 35, so that the developing roller 32 is spaced from the photoconductor drum 11.

First Embodiment

Figure 6:
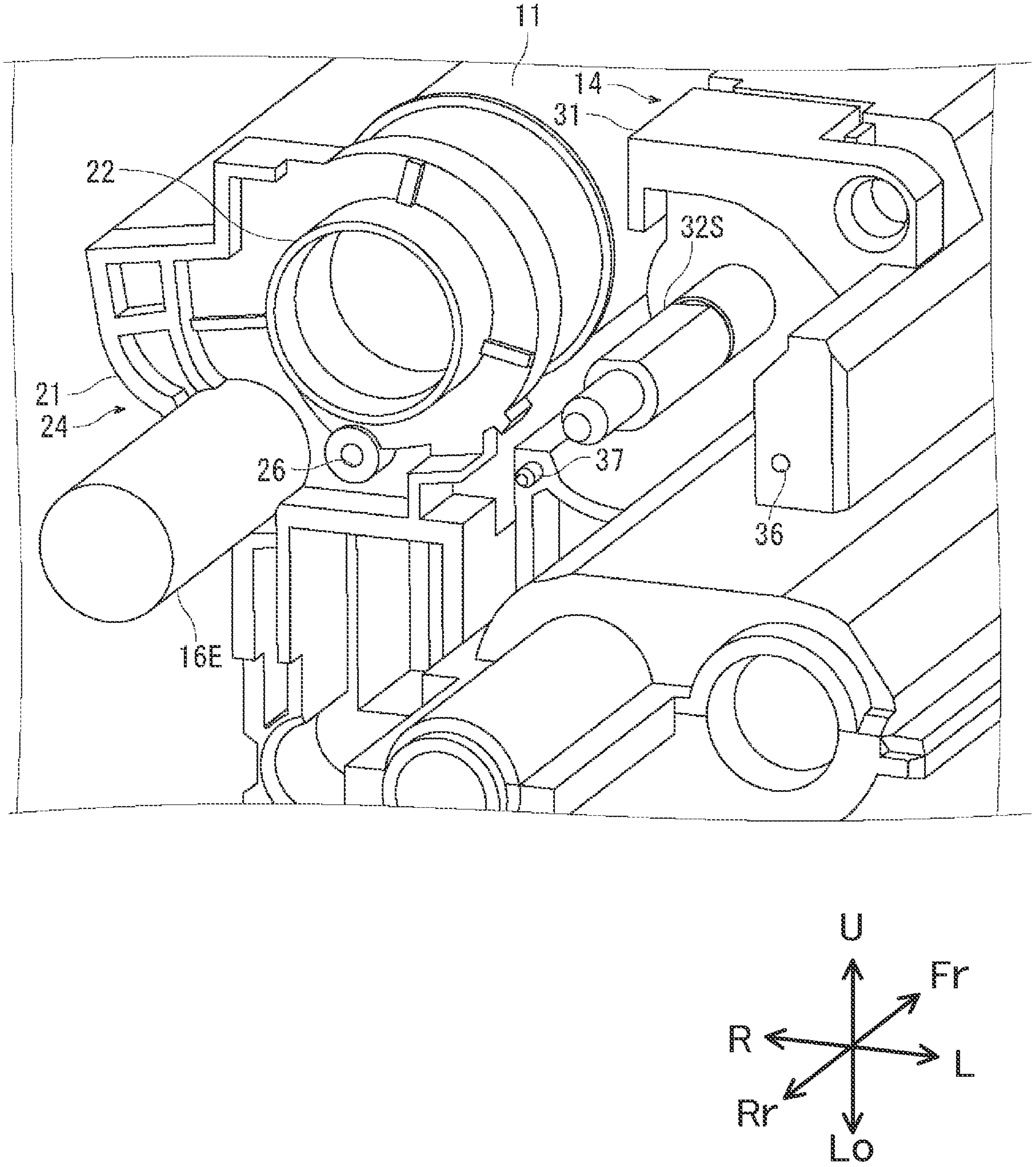
FIG. 6 is a perspective view showing a rear portion of the photoconductor unit and the developing unit, according to the first embodiment.
Figure 7:
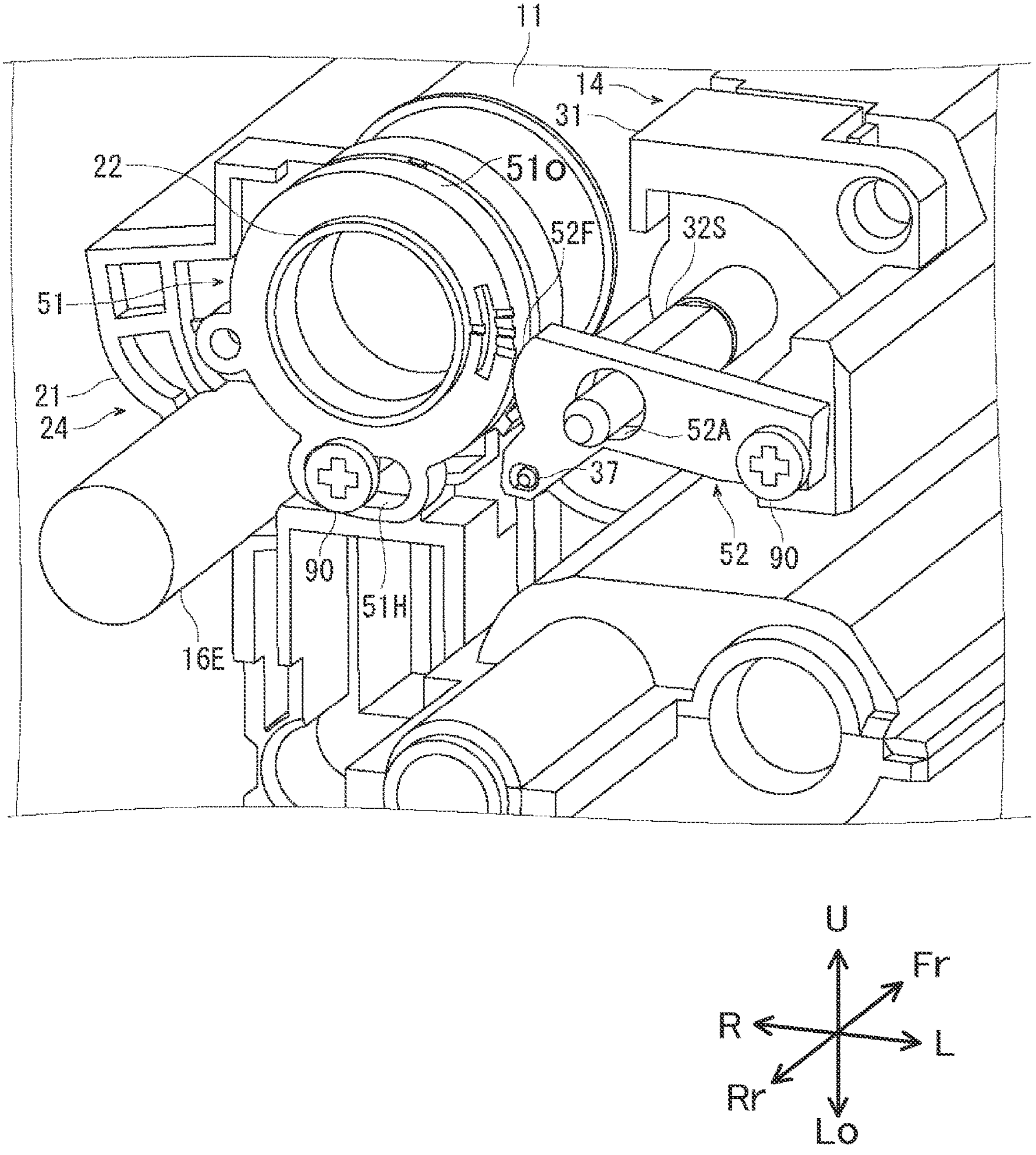
FIG. 7 is a perspective view showing how a first adjusting member and a second adjusting member according to the first embodiment are provided.
Figure 8:
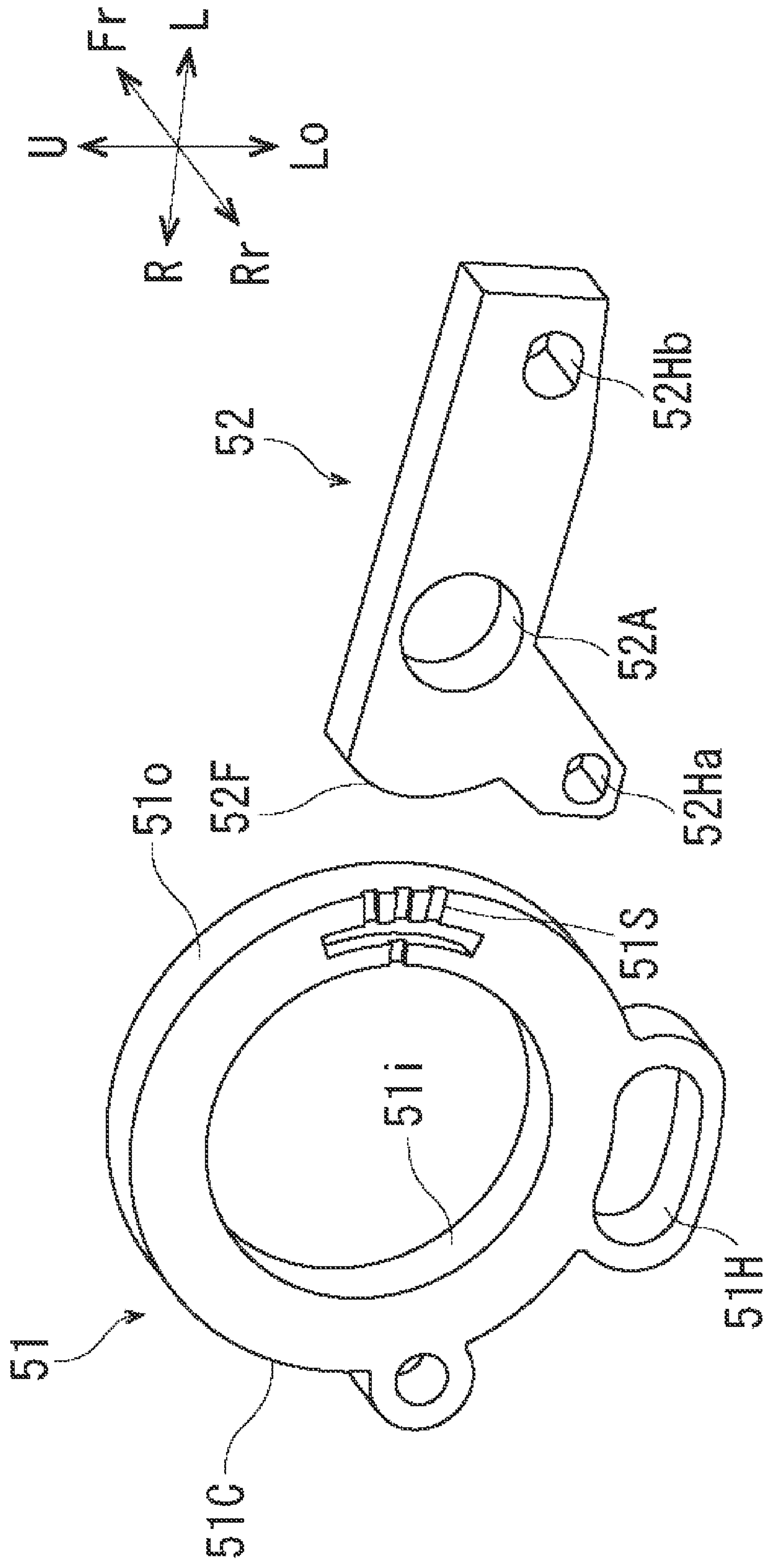
FIG. 8 is a perspective view showing the first adjusting member and the second adjusting member according to the first embodiment.
Figure 9:
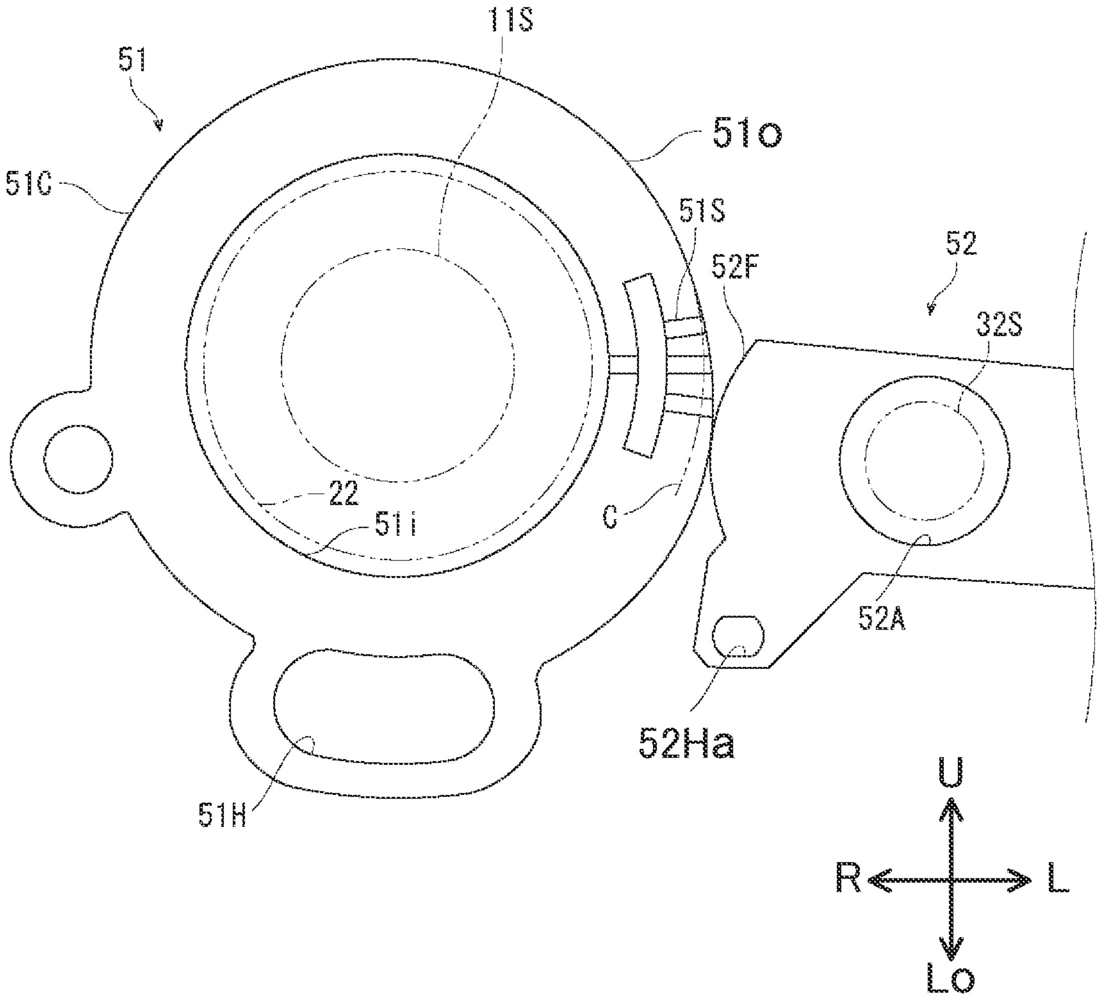
FIG. 9 is a back view showing the first adjusting member and the second adjusting member according to the first embodiment.
Figure 10:
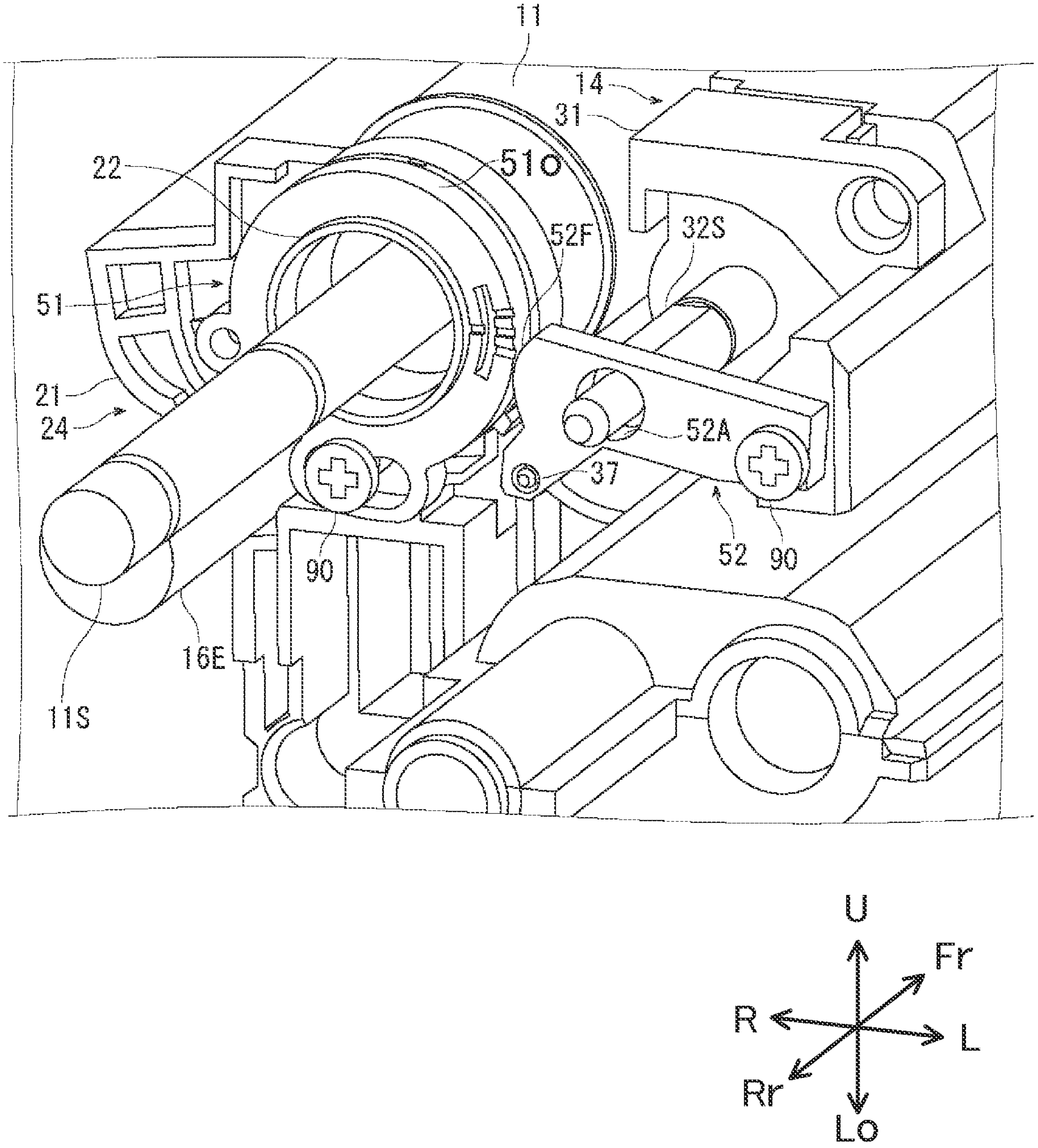
FIG. 10 is a perspective view showing how the shaft of a photoconductor drum according to the first embodiment is provided.

Hereunder, a configuration for adjusting the clearance between the developing roller 32 and the photoconductor drum 11, on the rear side of the image forming device 6, will be described. FIG. 6 is a perspective view showing the rear portion of the photoconductor unit 24 and the developing unit 14. FIG. 7 is a perspective view showing how a first adjusting member 51 and a second adjusting member 52 are provided. FIG. 8 is a perspective view showing the first adjusting member 51 and the second adjusting member 52. FIG. 9 is a back view showing the first adjusting member 51 and the second adjusting member 52. FIG. 10 is a perspective view showing how the shaft 11S of the photoconductor drum 11 is provided.

The image forming apparatus 100 includes a first shaft (e.g., shaft 11S) provided for one of the photoconductor drum 11 and the developing roller 32, a second shaft (e.g., shaft 32S) provided for the other of the photoconductor drum 11 and the developing roller 32, a first housing (e.g., photoconductor housing 21) supporting the first shaft, a second housing (e.g., developing housing 31) supporting the second shaft, a cylindrical supporting member 22 provided at the axial end portion of the first housing, and surrounding the first shaft without contact, and the first adjusting member 51 fitted with the outer surface of the supporting member 22, so as to rotate along the circumferential direction thereof. An outer circumferential surface 510 of the first adjusting member 51 is formed in an arcuately curved shape eccentric with respect to the supporting member 22, and located in contact with the second housing. The configuration of the shaft 11S, the shaft 32S, the photoconductor housing 21, and the developing housing 31 is as described above. The following description will primarily focus on the supporting member 22 and the first adjusting member 51.

Supporting Member 22

The supporting member 22 (see FIG. 6) is protruding backward from the rear end portion of the photoconductor housing 21. The supporting member 22 is provided so as to penetrate through the photoconductor housing 21, in the front-rear direction. The rear end portion of the shaft 11S (see FIG. 10) of the photoconductor drum 11 is protruding backward, through and from the supporting member 22. The inner diameter of the supporting member 22 is larger than the diameter of the shaft 11S of the photoconductor drum 11. The center of the supporting member 22 coincides with the center of the shaft 11S. The supporting member 22 is located so as to surround the shaft 11S, without contacting the same.

First Adjusting Member 51

The first adjusting member 51 (see FIG. 7 to FIG. 9) has a generally annular shape. The inner circumferential surface of the first adjusting member 51 is formed in a circular shape. The first adjusting member 51 is fitted with the outer surface of the supporting member 22, and rotatable along the circumferential direction of the supporting member 22.

The outer circumferential surface 510 of the first adjusting member 51 is formed in a substantially circular shape as a whole. A portion of the outer circumferential surface 510 on the side of the developing unit 14 is eccentric with respect to the supporting member 22. To be more specific, the portion of the outer circumferential surface 510 on the side of the developing unit 14 (left side in FIG. 9) is formed such that the diameter gradually increases in the clockwise direction. FIG. 9 illustrates the state where the outer circumferential surface 510 is gradually deviated from an imaginary line C representing a circle, in the clockwise direction. On the portion of the outer circumferential surface 510 where the diameter starts to gradually increase, scales 51S, serving as indices of the rotation angle of the first adjusting member 51, are provided.

A screw hole 26 is provided on the lower side of the supporting member 22 of the photoconductor housing 21 (see FIG. 6). An elongate slot 51H is formed on the lower side of the first adjusting member 51, along the circumferential direction thereof, at the position corresponding to the screw hole 26 (see FIG. 8 and FIG. 9). When a screw 90 is loosely fastened via the elongate slot 51H (see FIG. 7), the rotation angle of the first adjusting member 51 can be adjusted, within the length of the elongate slot 51H.

Second Adjusting Member 52

The second adjusting member 52 (see FIG. 7 to FIG. 9) is located on the rear end portion of the developing housing 31. The position of the second adjusting member 52 in the front-rear direction accords with the position of the first adjusting member 51 in the front-rear direction. The second adjusting member 52 is a plate-shaped member elongate in the left-right direction, as a whole. The second adjusting member 52 includes an opening 52A, larger in diameter than the shaft 32S of the developing roller 32. The shaft 32S is protruding backward from the second adjusting member 52, through the opening 52A. The second adjusting member 52 is mounted such that the opening 52A is kept from contacting the shaft 32S. The right-side end portion of the second adjusting member 52 constitutes a contact surface 52F, arcuately protruding to the right.

On the rear end portion of the developing housing 31, a pin 37 protruding backward is provided on the lower right side of the shaft 32S (see FIG. 6 and FIG. 7). The second adjusting member 52 includes an elongate slot 52Ha for accommodating the pin 37 (see FIG. 8 and FIG. 9). On the rear end portion of the developing housing 31, a screw hole 36 is provided on the left side of the shaft 32S. The second adjusting member 52 includes an elongate slot 52Hb formed at the position corresponding to the screw hole 36. When another screw 90 is loosely fastened via the elongate slot 52Hb, the position of the second adjusting member 52 in the left-right direction can be adjusted, within the length of the elongate slot 52Hb. The second adjusting member 52 is fixed to the developing housing 31, by fusion bonding. The first adjusting member 51 is fixed to the photoconductor housing 21 by fusion bonding, after the clearance between the developing roller 32 and the photoconductor drum 11 is adjusted by rotating the first adjusting member 51.

The developing housing 31 is biased toward the photoconductor housing 21 by the biasing member 35, and therefore the contact surface 52F of the second adjusting member 52 is pressed against the left-side portion of the outer circumferential surface 510 of the first adjusting member 51 (see FIG. 9). The left-side portion of the outer circumferential surface 510 of the first adjusting member 51 is formed such that the diameter gradually increases in the clockwise direction. Accordingly, the clockwise rotation of the first adjusting member 51 causes the developing roller 32 to move toward the photoconductor drum 11, and the counterclockwise rotation of the first adjusting member 51 causes the developing roller 32 to move away from the photoconductor drum 11.

Now, in the aforementioned existing electrophotographic apparatus, the end portion of the shaft of the developing roller is fitted in the recess of the eccentric cam, and therefore the vibration arising from the rotation of the developing roller is transmitted to the photoconductor drum via the eccentric cam, which may affect the picture quality. As a possible solution, for example, a member that can move toward and away from the shaft of the developing roller and the photoconductor drum without contact may be provided in the developing housing and the photoconductor housing. With such a configuration, however, the adjustment accuracy of the clearance may be degraded, owing to deformation or positional shift of the member.

In contrast, the image forming apparatus 100 according to the first embodiment includes the first shaft (e.g., shaft 11S) provided for one of the photoconductor drum 11 and the developing roller 32, the second shaft (e.g., shaft 32S) provided for the other of the photoconductor drum 11 and the developing roller 32, the first housing (e.g., photoconductor housing 21) supporting the first shaft, the second housing (e.g., developing housing 31) supporting the second shaft, the cylindrical supporting member 22 provided on the axial end portion of the first shaft of the first housing, and surrounding the first shaft without contacting the same, and the first adjusting member 51 fitted with the outer surface of the supporting member 22, so as to rotate along the circumferential direction thereof. The outer circumferential surface 510 of the first adjusting member 51 is formed in the arcuately curved shape eccentric with respect to the supporting member 22, and located in contact with the second housing.

With the mentioned configuration, the first adjusting member 51 is supported by the supporting member 22 over the entire circumference, and is therefore unlikely to be deformed, compared with the member that can move toward and away from the second shaft. In addition, the first adjusting member 51 is kept from rotating, even though the second adjusting member 52 exerts a pressing force to the first adjusting member 51, and therefore the clearance between the first shaft and the second shaft remains unchanged. Further, the clearance can be adjusted by rotating the arcuately curved surface, eccentric with respect to the supporting member 22, along the circumferential direction, and therefore fine adjustment of the clearance can be easily performed. Furthermore, since the supporting member 22 is not in contact with the first shaft, the vibration arising from the rotation of the first shaft is barely transmitted to the first adjusting member 51 and the second adjusting member 52. Consequently, the configuration according to the first embodiment contributes to improving the adjustment accuracy of the clearance between the developing roller 32 and the photoconductor drum 11.

In the image forming apparatus 100 according to the first embodiment, the first housing includes the screw hole 26 located adjacent to the supporting member 22. The first adjusting member 51 includes the elongate slot 51H formed along the circumferential direction, at the position corresponding to the screw hole 26. Such a configuration enables the first adjusting member 51 to be fusion-bonded to the first housing, with the rotation angle of the first adjusting member 51 fixed, thereby suppressing an angular shift in the fusion bonding work.

The image forming apparatus 100 according to the first embodiment includes the second adjusting member 52, located on the axial end portion of the second shaft of the second housing, including the opening 52A larger in diameter than the second shaft, configured to surround the second shaft without allowing the opening 52A to contact the second shaft, and located in contact with the first adjusting member 51. The mentioned configuration prevents the vibration arising from the rotation of the second shaft from being transmitted to the second adjusting member 52 and the first adjusting member 51, thereby suppressing fluctuation in clearance between the developing roller 32 and the photoconductor drum 11 due to the vibration.

Further, the image forming apparatus 100 according to the first embodiment includes the biasing member 35 that biases the developing roller 32 toward the photoconductor drum 11. Therefore, the developing roller 32 can be accurately positioned.

Variation of First Embodiment

The first embodiment may be modified as follows.

In the first embodiment, the supporting member 22 and the first adjusting member 51 are provided on the rear end portion of the photoconductor housing 21. However, the supporting member 22 and the first adjusting member 51 may be provided on the front end portion of the photoconductor housing 21. Alternatively, the supporting member 22 and the first adjusting member 51 may be provided on the front and rear end portions of the photoconductor housing 21.

In the first embodiment, the supporting member 22 and the first adjusting member 51 are provided on the photoconductor housing 21. Instead, the supporting member 22 and the first adjusting member 51 may be provided on the developing housing 31.

Second Embodiment

Figure 11:
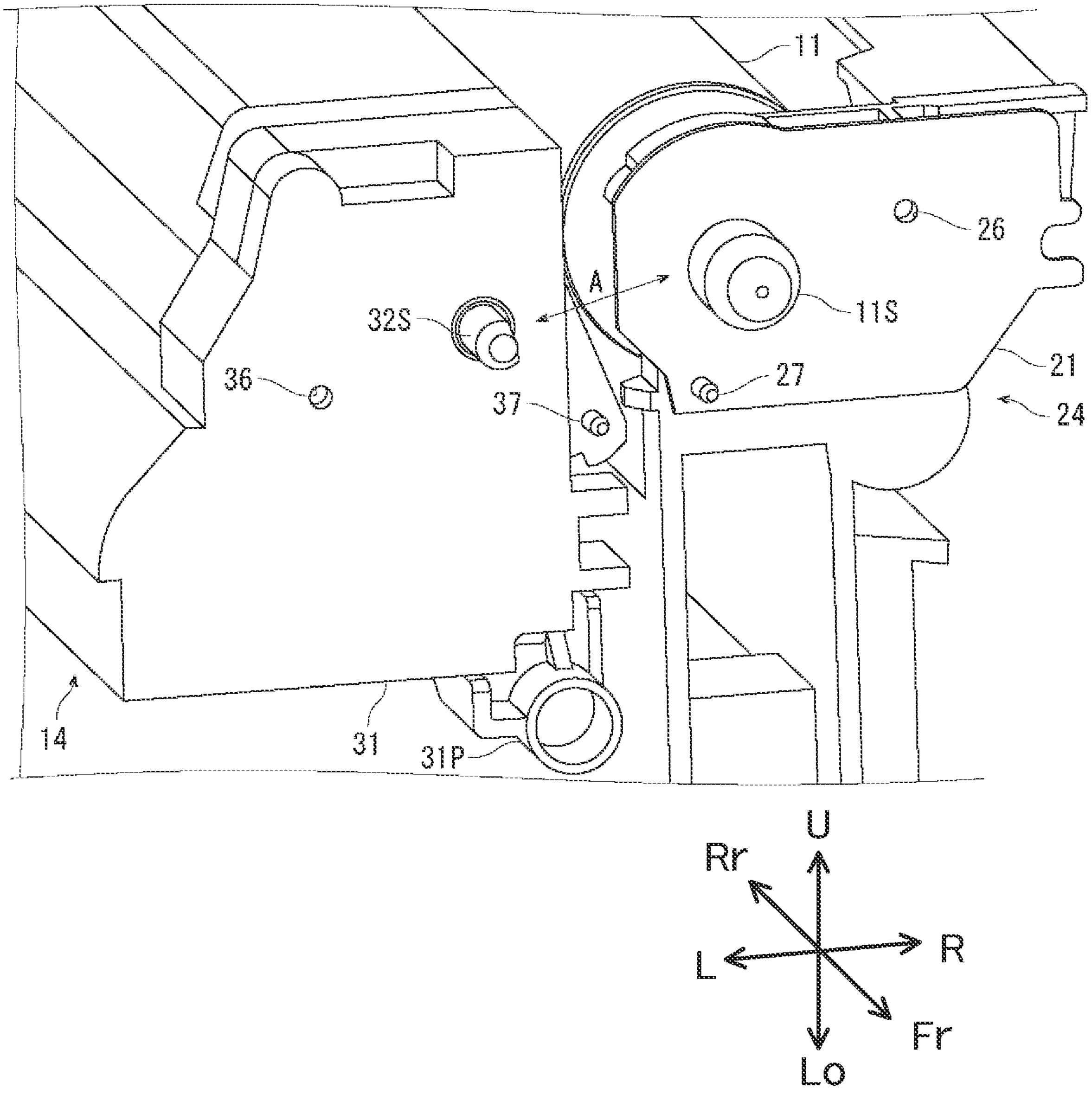
FIG. 11 is a perspective view showing the front portion of a photoconductor unit and a developing unit according to a second embodiment.
Figure 12:
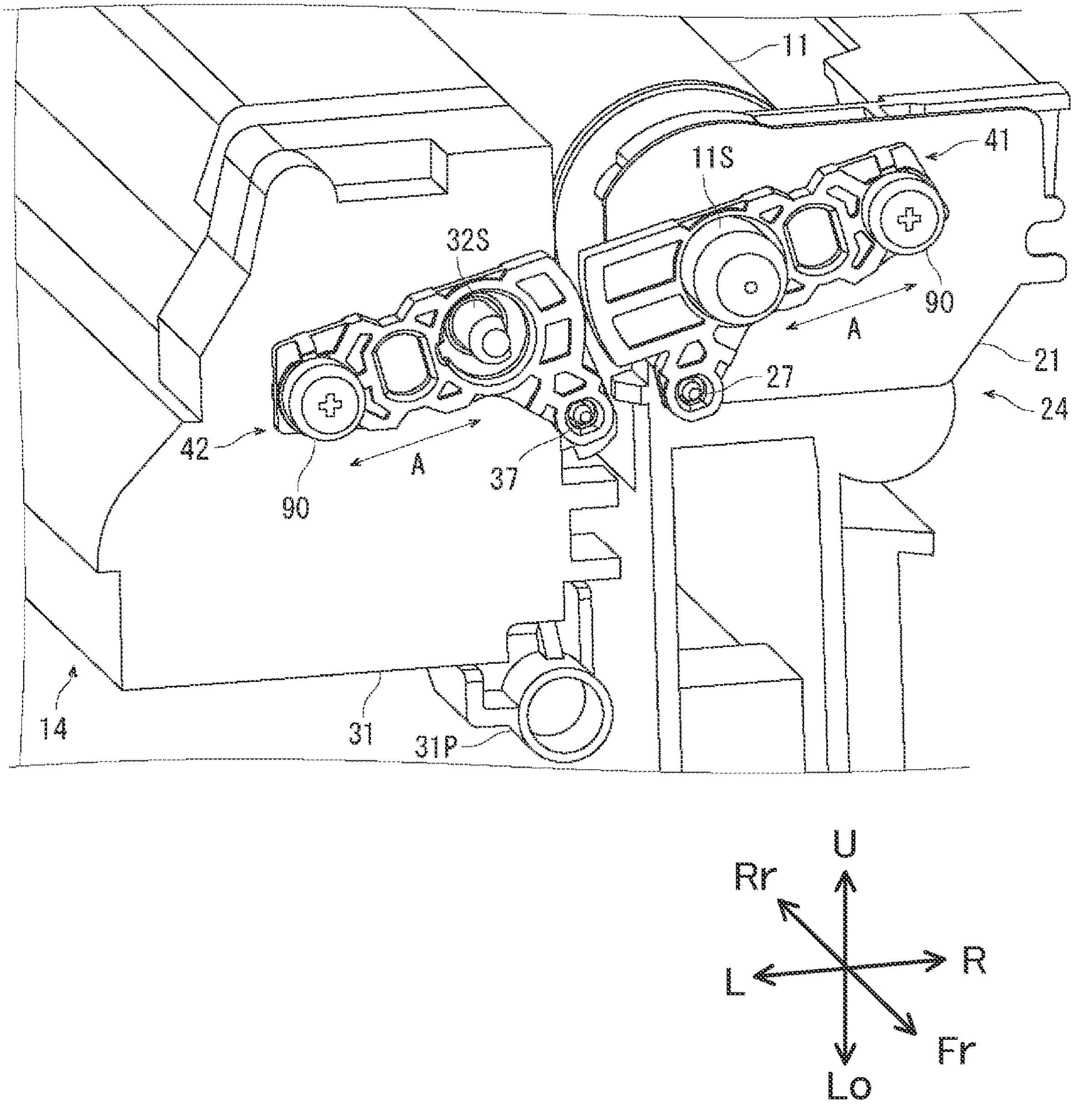
FIG. 12 is a perspective view showing how a first contact member and a second contact member according to the second embodiment are provided.
Figure 13:
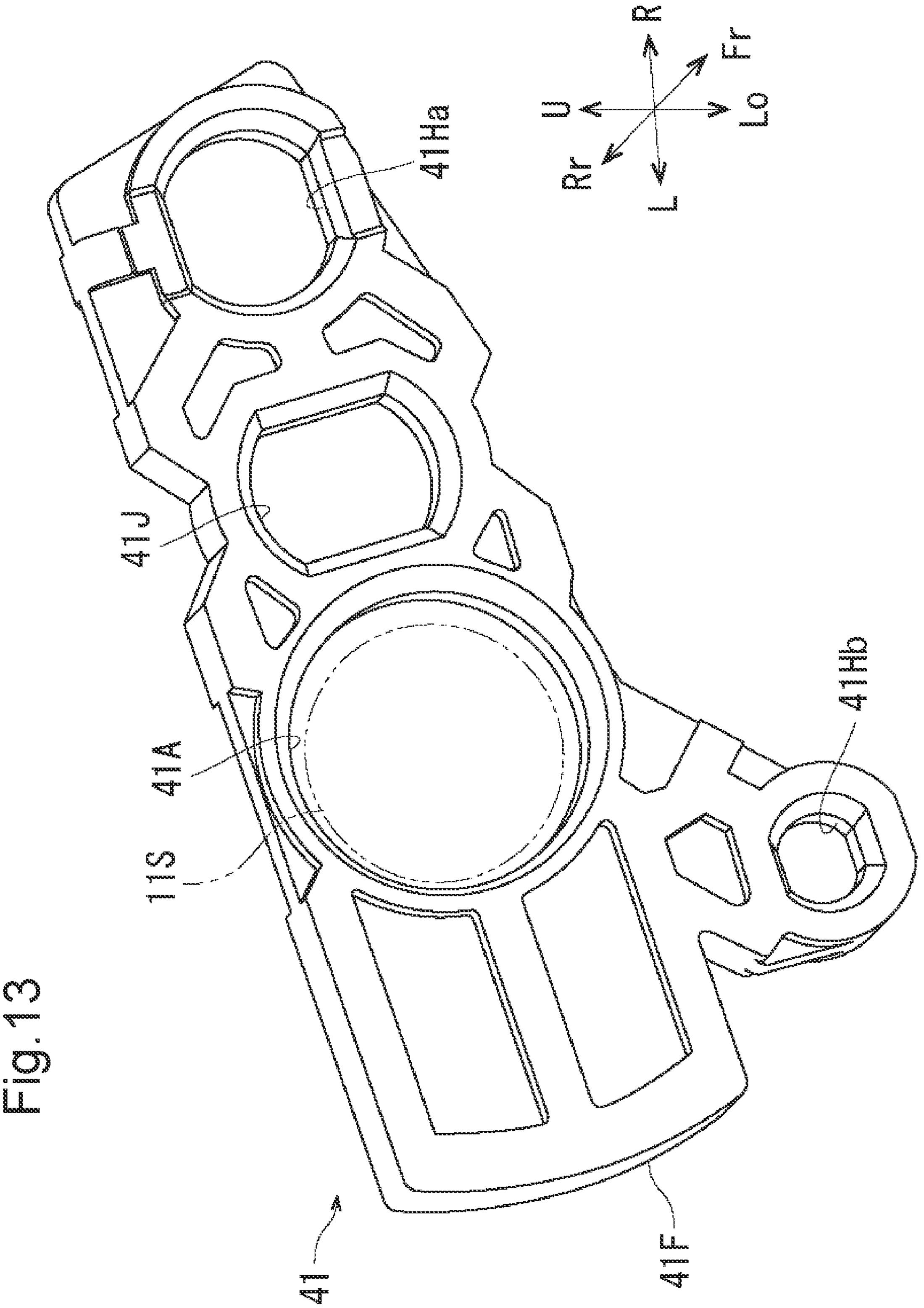
FIG. 13 is a perspective view showing the first contact member according to the second embodiment.
Figure 14:
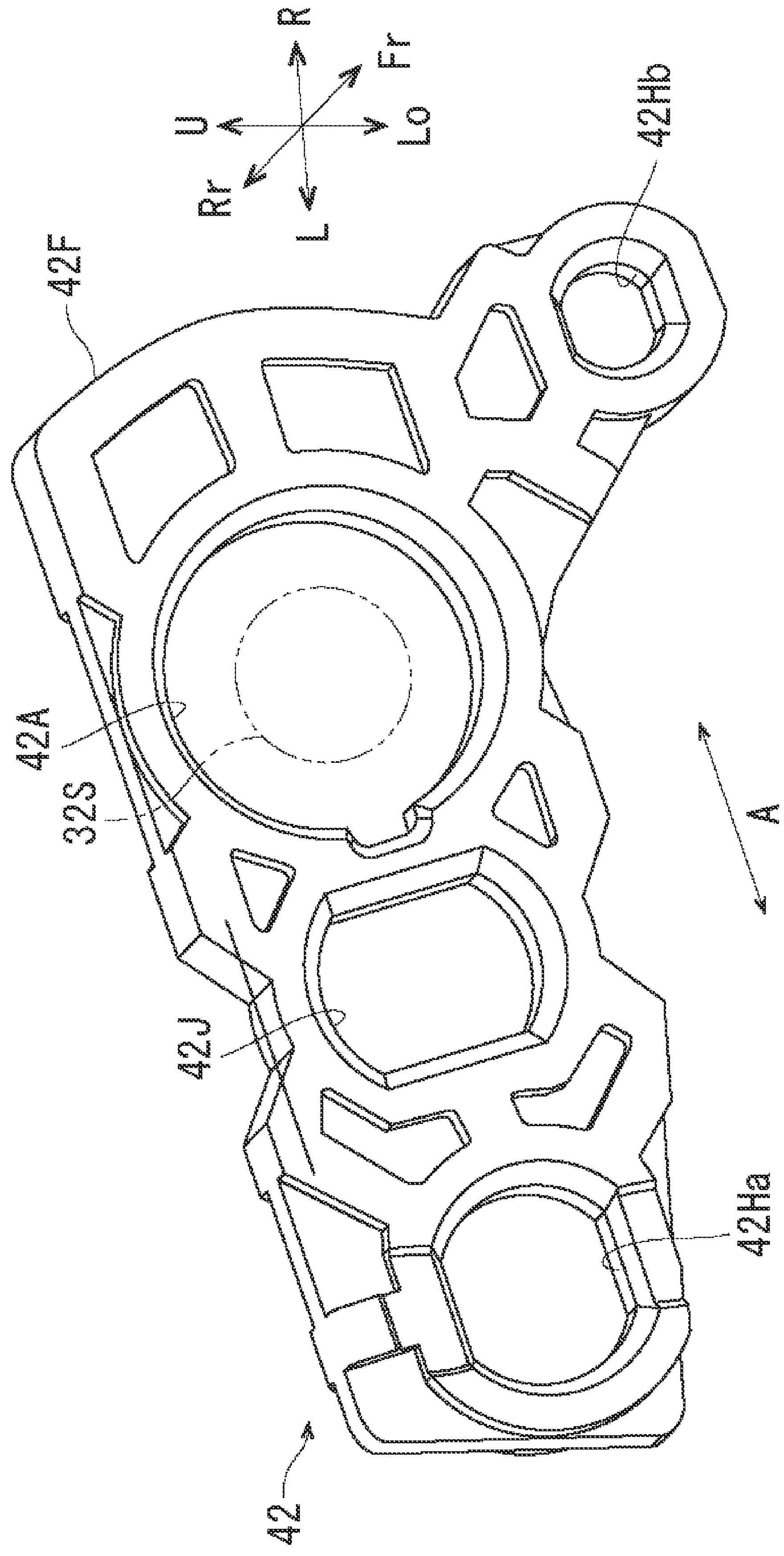
FIG. 14 is a perspective view showing the second contact member according to the second embodiment.
Figure 15:
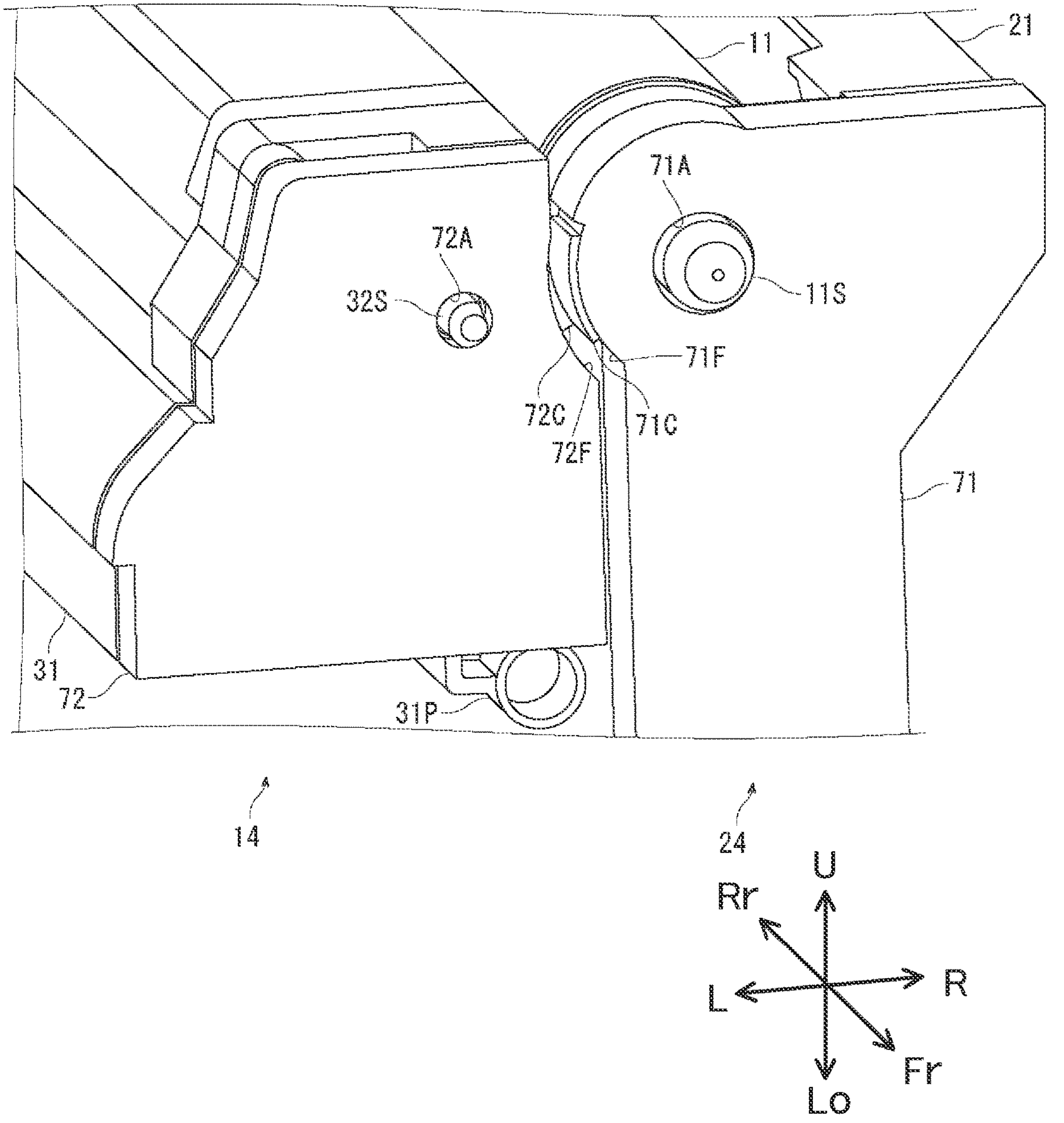
FIG. 15 is a perspective view showing how a first cover and a second cover according to the second embodiment are provided.
Figure 16:
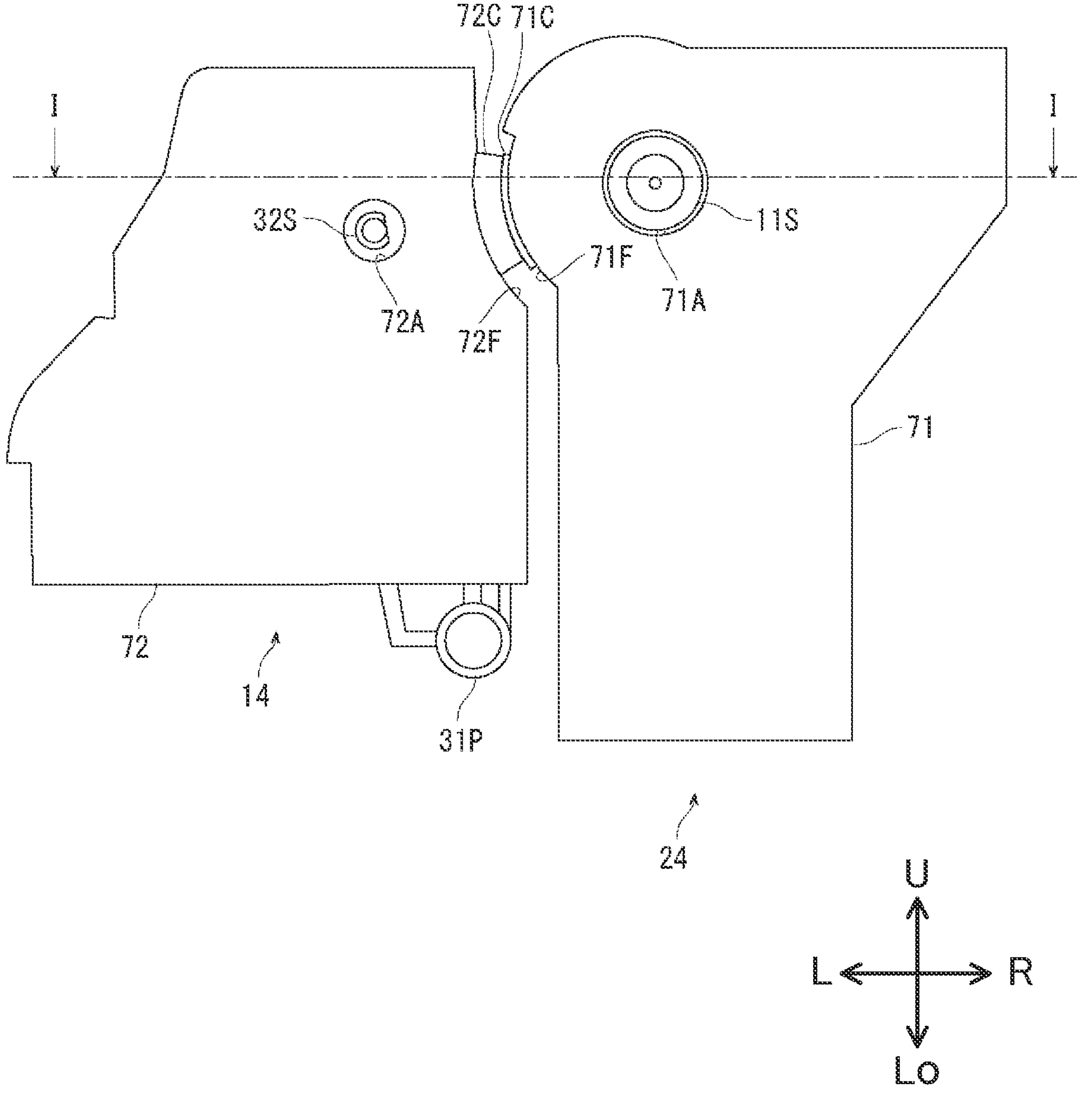
FIG. 16 is a front view showing the first cover and the second cover according to the second embodiment.
Figure 17:
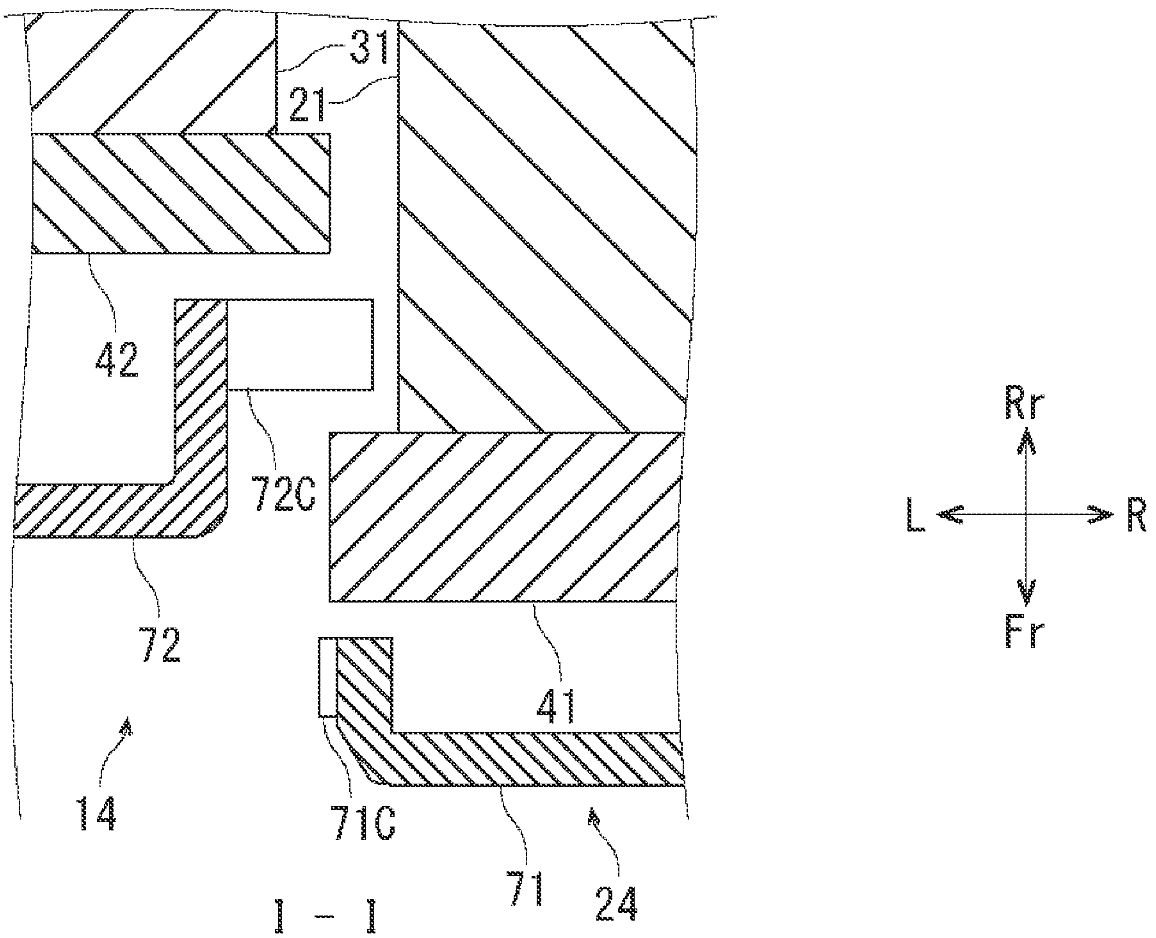
FIG. 17 to FIG. 19 are cross-sectional views taken along a line I-I in FIG. 16, showing how the photoconductor unit is mounted, with the developing unit mounted on the image forming apparatus.

Hereunder, a configuration for adjusting the clearance between the developing roller 32 and the photoconductor drum 11, on the front side of the image forming device 6, will be described. FIG. 11 is a perspective view showing the front portion of the photoconductor unit 24 and the developing unit 14. FIG. 12 is a perspective view showing how a first contact member 41 and a second contact member 42 are provided. FIG. 13 is a perspective view showing the first contact member 41. FIG. 14 is a perspective view showing the second contact member 42. FIG. 15 is a perspective view showing how a first cover 71 and a second cover 72 are provided. FIG. 16 is a front view showing the first cover 71 and the second cover 72. FIG. 17 is a cross-sectional view taken along a line I-I in FIG. 16. FIG. 17 shows the photoconductor unit 24 drawn out to the front side.

The image forming apparatus 100 includes the first shaft (e.g., shaft 11S) provided for one of the photoconductor drum 11 and the developing roller 32, the second shaft (e.g., shaft 32S) provided for the other of the photoconductor drum 11 and the developing roller 32, the first housing (e.g., photoconductor housing 21) supporting the first shaft, and removable in the axial direction, the second housing (e.g., developing housing 31) supporting the second shaft, and removable in the axial direction, the first contact member 41 provided on the axial end portion of the first housing, the second contact member 42 provided on the axial end portion of the second housing, and located in contact with the first contact member 41, the first cover 71 covering the first contact member 41, and a first cleaning member 71C provided on the first cover 71, and configured to rub against the second contact member 42 when the second housing is inserted or removed. Here, the shaft 11S, the shaft 32S, the photoconductor housing 21, and the developing housing 31 are configured as described above. The following description will primarily focus on the first contact member 41, the second contact member 42, the first cleaning member 71C, and a second cleaning member 72C.

The first contact member 41 and the second contact member 42 (see FIG. 12) are generally rectangular, plate-shaped members, elongate in the direction of a line intersecting the shaft 11S of the photoconductor drum 11 and the shaft 32S of the developing roller 32. In the second embodiment, the shaft 11S of the photoconductor drum 11 is located slightly on the upper side of the shaft 32S of the developing roller 32. Accordingly, the line intersecting the shaft 11S of the photoconductor drum 11 and the shaft 32S of the developing roller 32 is inclined such that the side of the photoconductor drum 11 (right side) becomes higher. Therefore, the first contact member 41 and the second contact member 42 are also inclined such that the right side becomes slightly higher. Hereinafter, the direction of the line intersecting the shaft 11S of the photoconductor drum 11 and the shaft 32S of the developing roller 32 will be referred to as adjustment direction A.

First Contact Member 41

The first contact member 41 (see FIG. 13) includes a contact surface 41F, formed on the left end portion so as to arcuately protrude to the left. On the right side of the first contact surface 41F, an opening 41A, a jig insertion hole 41J, and an elongate slot 41Ha are provided in this order from the left. An elongate slot 41Hb is formed in the portion protruding downward from the position between the contact surface 41F and the opening 41A. The opening 41A is a generally circular hole penetrating through the first contact member 41 in the front-rear direction, and larger in diameter than the shaft 11S of the photoconductor drum 11. The jig insertion hole 41J is formed so as to penetrate through the first contact member 41 in the front-rear direction. The elongate slots 41Ha and 41Hb are formed so as to penetrate through the first contact member 41 in the front-rear direction front-rear direction, and elongate in the adjustment direction A.

On the front end portion of the photoconductor housing 21 (see FIG. 11), a screw hole 26 corresponding to the elongate slot 41Ha, and a pin 27 to be inserted in the elongate slot 41Hb are provided. The front end portion of the shaft 11S of the photoconductor drum 11 is inserted in the opening 41A (see FIG. 12). The first contact member 41 is fixed to the photoconductor housing 21 with a screw 90, via the elongate slot 41Ha.

Second Contact Member 42

The second contact member 42 (see FIG. 14) is formed in a generally similar shape to the first contact member 41. The second contact member 42 includes a contact surface 42F formed on the right end portion, so as to arcuately protrude to the right. On the left side of the contact surface 42F, an opening 42A, a jig insertion hole 42J, and an elongate slot 42Ha are provided in this order from the right. The distance between the contact surface 42F and the opening 42A is shorter than the distance between the contact surface 41F and the opening 41A. An elongate slot 42Hb is formed in the portion protruding downward from the position between the contact surface 42F and the opening 42A. The opening 42A is a generally circular hole penetrating through the second contact member 42 in the front-rear direction, and larger in diameter than the shaft 32S of the developing roller 32. The jig insertion hole 42J is formed so as to penetrate through the second contact member 42 in the front-rear direction. The elongate slots 42Ha and 42Hb are formed so as to penetrate through the second contact member 42 in the front-rear direction, and elongate in the adjustment direction A.

On the front end portion of the developing housing 31 (see FIG. 11), a screw hole 36 corresponding to the elongate slot 42Ha, and a pin 37 to be inserted in the elongate slot 42Hb are provided. The front end portion of the shaft 32S of the developing roller 32 is inserted in the opening 42A (see FIG. 12). The second contact member 42 is fixed to the developing housing 31 with another screw 90, via the elongate slot 42Ha.

The clearance between the developing roller 32 and the photoconductor drum 11 can be adjusted, by loosely fastening the screws 90 via the elongate slots 41Ha and 42Ha, and moving either or both of the first contact member 41 and the second contact member 42 along the adjustment direction A.

First Cleaning Member 71C and Second Cleaning Member 42

The front end portion of the photoconductor housing 21 and the first contact member 41 are covered with the first cover 71 (see FIG. 15 and FIG. 16). The first cover 71 includes an opening 71A, formed at the position corresponding to the shaft 11S of the photoconductor drum 11, and larger in diameter than the shaft 11S. The shaft 11S is protruding forward from the first cover 71, through the opening 71A. An upper left portion 71F of the first cover 71 is formed in a convex arcuate shape along the outer circumferential surface of the photoconductor drum 11. On the upper left portion 71F of the first cover 71, the first cleaning member 71C is provided. The first cleaning member 71C is, for example, a brush.

The front end portion of the developing housing 31 and the second contact member 42 are covered with the second cover 72. The second cover 72 includes an opening 72A, formed at the position corresponding to the shaft 32S of the developing roller 32, and larger in diameter than the shaft 32S. The shaft 32S is protruding forward from the second cover 72, through the opening 72A. An upper right portion 72F of the second cover 72 is formed in a concave arcuate shape, so as not to interfere with the first cover 71. On the upper right portion 72F of the second cover 72, the second cleaning member 72C is provided. The first cleaning member 71C is, for example, a brush having longer hair than the first cleaning member 71C.

Figure 18:
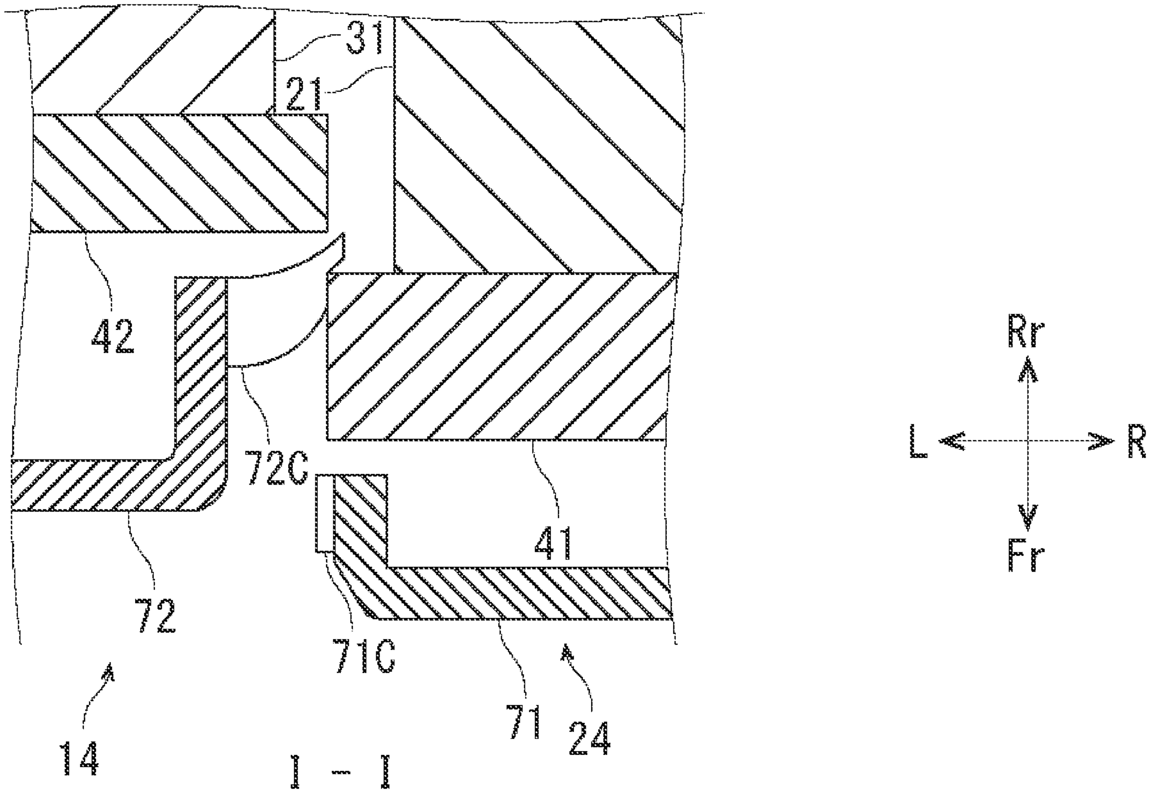
Figure 19:
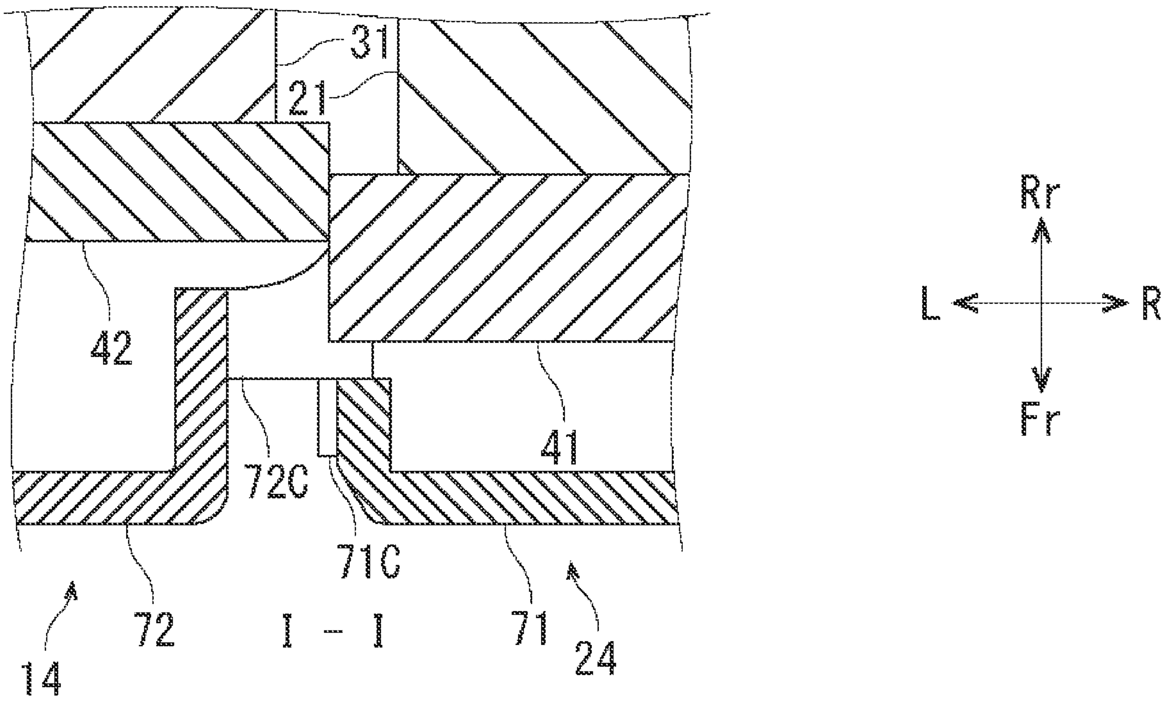

Hereunder, an operation of the image forming apparatus 100 according to the second embodiment will be described. FIG. 17 to FIG. 19 are cross-sectional views taken along a line I-I in FIG. 16, showing how the photoconductor unit 24 is mounted, with the developing unit 14 mounted on the image forming apparatus 100.

The photoconductor unit 24 is inserted backward, from the front side of the image forming apparatus 100 (see FIG. 17). For this purpose, the developing unit 14 is moved away from the photoconductor unit 24 in advance, against the biasing force of the biasing member 35 as shown in FIG. 5, to prevent interference between the photoconductor unit 24 and the developing unit 14.

The distal end portion of the second cleaning member 72C is located on the farther side (rear side) of the first contact member 41. As the photoconductor unit 24 is inserted further, the first contact member 41 comes closer to the second cleaning member 72C. When the rear end portion of the first contact member 41 passes the position of the front end portion of the second cleaning member 72C, the first contact member 41 moves backward, while rubbing against the second cleaning member 72C (see FIG. 18). As result, when a foreign matter, if any, is stuck to the first contact member 41, the foreign matter is removed by the second cleaning member 72C.

When the photoconductor unit 24 is completely inserted, the first contact member 41 is opposed to the second contact member 42 (see FIG. 19). Then the developing unit 14 is moved closer to the photoconductor unit 24 as shown in FIG. 4, by removing the resisting force against the biasing member 35. As result, the first contact member 41 and the second contact member 42 enter into contact with each other, and the photoconductor drum 11 and the developing roller 32 are opposed to each other with a predetermined clearance therebetween.

Figure 20:
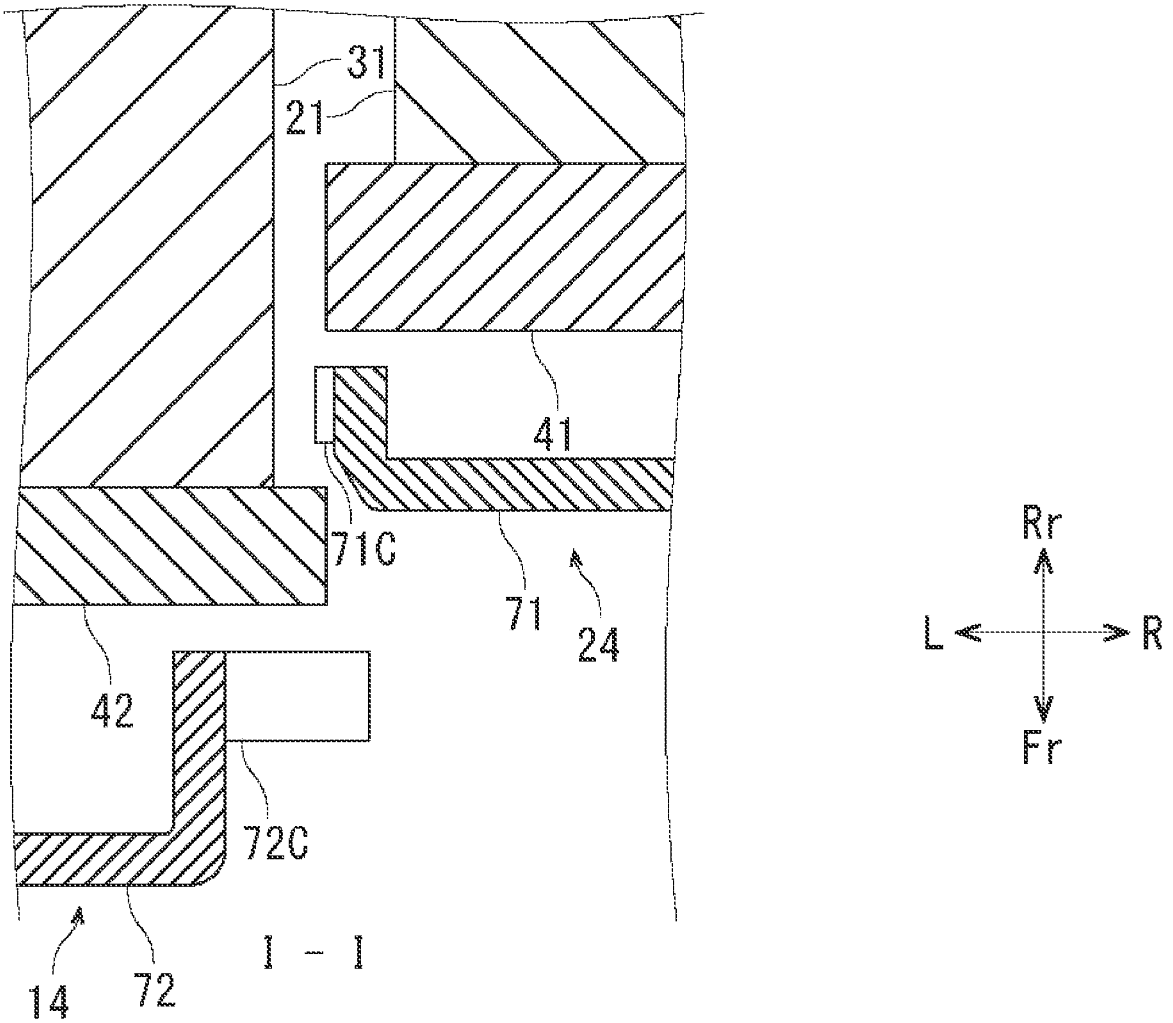
FIG. 20 to FIG. 22 are cross-sectional views taken along the line I-I in FIG. 16, showing how the developing unit is mounted, with the photoconductor unit mounted on the image forming apparatus.
Figure 21:
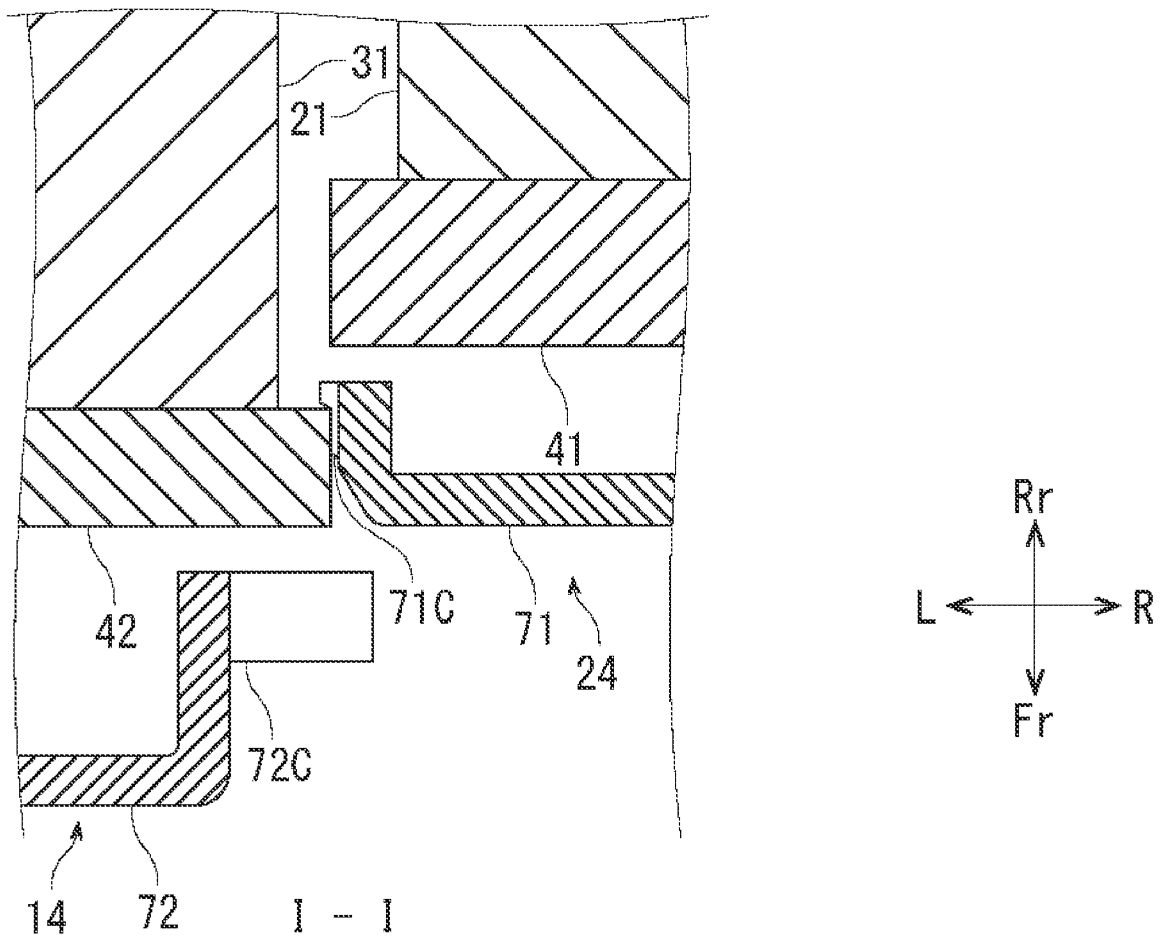
Figure 22:
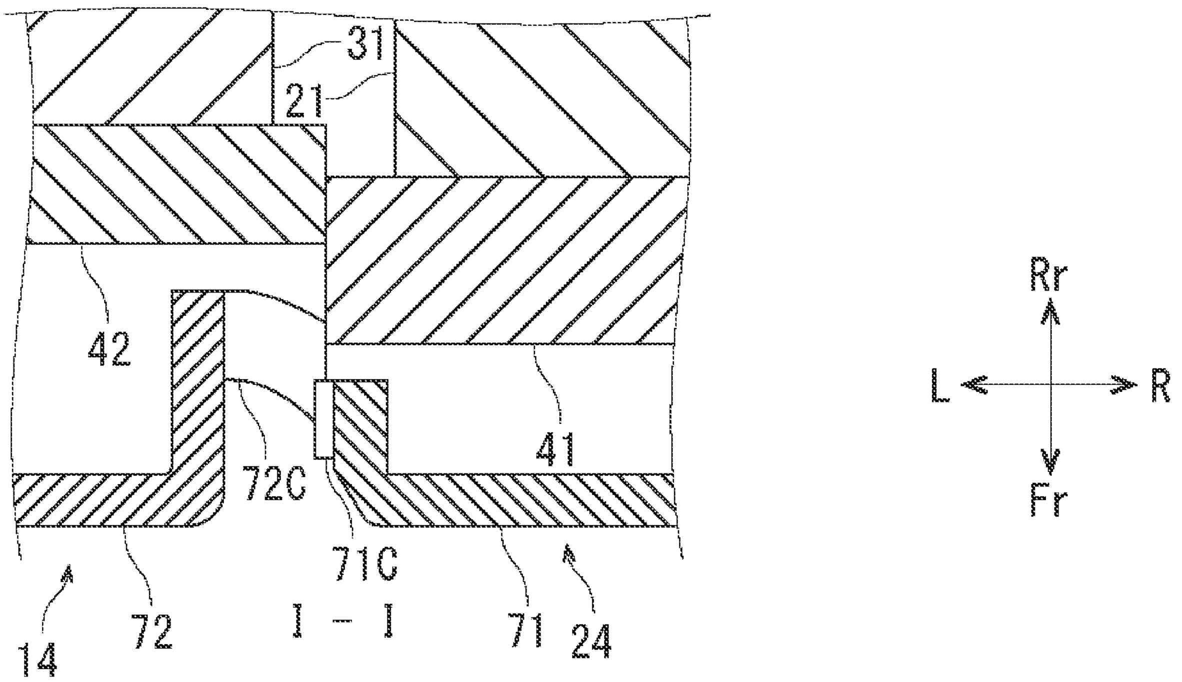

FIG. 20 to FIG. 22 are cross-sectional views taken along the line I-I in FIG. 16, showing how the developing unit 14 is mounted, with the photoconductor unit 24 mounted on the image forming apparatus 100.

The developing unit 14 is inserted backward, from the front side of the image forming apparatus 100 (see FIG. 20). In this case also, the developing unit 14 is moved away from the photoconductor unit 24 in advance, against the biasing force of the biasing member 35 as shown in FIG. 5, to prevent interference between the photoconductor unit 24 and the developing unit 14.

The distal end portion of the first cleaning member 71C is located on the farther side (rear side) of the second contact member 42. As the developing unit 14 is inserted further, the second contact member 42 comes closer to the first cleaning member 71C. When the rear end portion of the second contact member 42 passes the position of the front end portion of the first cleaning member 71C, the second contact member 42 moves backward, while rubbing against the first cleaning member 71C (see FIG. 21). As result, when a foreign matter, if any, is stuck to the second contact member 42, the foreign matter is removed by the first cleaning member 71C.

When the second contact member 42 passes the position of the first cleaning member 71C, the second cleaning member 72C moves backward, while rubbing against the first cleaning member 71C. At this point, since the first cleaning member 71C and the second cleaning member 72C are different in hair length from each other, the first cleaning member 71C and the second cleaning member 72C can be prevented from becoming entangled with each other.

When the developing unit 14 is completely inserted, the second contact member 42 is opposed to the first contact member 41 (see FIG. 22). Then the developing unit 14 is moved closer to the photoconductor unit 24 as shown in FIG. 4, by removing the resisting force against the biasing member 35. As result, the first contact member 41 and the second contact member 42 enter into contact with each other, and the photoconductor drum 11 and the developing roller 32 are opposed to each other with a predetermined clearance therebetween.

As described thus far, the image forming apparatus 100 according to the second embodiment includes the first shaft (e.g., shaft 11S) provided for one of the photoconductor drum 11 and the developing roller 32, the second shaft (e.g., shaft 32S) provided for the other of the photoconductor drum 11 and the developing roller 32, the first housing (e.g., photoconductor housing 21) supporting the first shaft, and removable in the axial direction of the first shaft, the second housing (e.g., developing housing 31) supporting the second shaft, and removable in the axial direction of the second shaft, the first contact member 41 provided on the axial end portion of the first housing, the second contact member 42 provided on the axial end portion of the second housing, and located in contact with the first contact member 41, the first cover 71 covering the first contact member 41, and the first cleaning member 71C provided on the first cover 71, and configured to rub against the second contact member 42 when the second housing is inserted or removed. The mentioned configuration enables removal of a foreign matter, stuck to the second contact member 42 for adjusting the clearance between the developing roller 32 and the photoconductor drum 11. Therefore, the adjustment accuracy of the clearance between the developing roller 32 and the photoconductor drum 11 can be improved.

In addition, the image forming apparatus 100 according to the second embodiment includes the second cover 72 covering the second contact member 42, and the second cleaning member 72C provided on the second cover 72, and configured to rub against the first contact member 41 when the first housing is inserted or removed. With the mentioned configuration, a foreign matter stuck to the second contact member 42, as well as a foreign matter stuck to the first contact member 41, can be removed. Consequently, the adjustment accuracy of the clearance between the developing roller 32 and the photoconductor drum 11 can be further improved.

Further, in the image forming apparatus 100 according to the second embodiment, the first cleaning member 71C and the second cleaning member 72C are brushes, different in hair length from each other. Such a configuration more effectively prevents the first cleaning member 71C and the second cleaning member 72C from becoming entangled with each other, compared with the case where the first cleaning member 71C and the second cleaning member 72C have the same hair length.

Variation of Second Embodiment

The second embodiment may be modified as follows.

In the second embodiment, the first cleaning member 71C and the second cleaning member 72C are both brushes. However, one of the first cleaning member 71C and the second cleaning member 72C may be formed of felt, and the other may be a brush. Such a configuration can also prevent the entanglement between the first cleaning member 71C and the second cleaning member 72C.

Although the first contact member 41 and the second contact member 42 are provided on the front end portion of the photoconductor housing 21 and the developing housing 31, in the second embodiment, the first contact member 41 and the second contact member 42 may be provided on the rear end portion of the photoconductor housing 21 and the developing housing 31.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
a photoconductor drum;
a developing roller;
a first shaft provided for one of the photoconductor drum and the developing roller;
a second shaft provided for the other of the photoconductor drum and the developing roller;
a first housing that supports the first shaft;
a second housing that supports the second shaft;
a cylindrical supporting member provided at an axial end portion of the first shaft of the first housing, and surrounding the first shaft without contact; and
a first adjusting member fitted with an outer surface of the cylindrical supporting member, and rotatable in a circumferential direction of the cylindrical supporting member, wherein
the first adjusting member having an outer circumferential surface, formed in an arcuately curved shape eccentric with respect to the cylindrical supporting member, and located in contact with the second housing, and
the image forming apparatus further comprising a second adjusting member provided on an axial end of the second shaft of the second housing, including an opening larger in diameter than the second shaft, surrounding the second shaft without allowing the opening to contact the second shaft, and located in contact with the first adjusting member.

2. The image forming apparatus according to claim 1,
wherein the first housing includes a screw hole located adjacent to the cylindrical supporting member, and
the first adjusting member includes an elongated slot formed along the circumferential direction, at a position corresponding to the screw hole.

3. The image forming apparatus according to claim 1, further comprising a biasing member that biases the developing roller toward the photoconductor drum.

4. The image forming apparatus according to claim 1,
wherein a portion of the outer circumferential surface of the first adjusting member on a side of the developing roller is formed such that a diameter gradually increases in a clockwise direction, and scales serving as indices of a rotation angle of the first adjusting member are provided on the portion where the diameter gradually increases.

* * * * *